United States Patent
Goto et al.

(10) Patent No.: US 7,072,109 B2
(45) Date of Patent: Jul. 4, 2006

(54) PROJECTION SCREEN AND PROJECTION DISPLAY

(75) Inventors: Masahiro Goto, Shinjuku-Ku (JP); Hitomu Watanabe, Shinjuku-Ku (JP); Yoshiki Yoshida, Shinjuku-Ku (JP); Hiroshi Sekiguchi, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 24 days.

(21) Appl. No.: 10/496,652

(22) PCT Filed: Jun. 27, 2003

(86) PCT No.: PCT/JP03/08234

§ 371 (c)(1),
(2), (4) Date: May 25, 2004

(87) PCT Pub. No.: WO2004/003661

PCT Pub. Date: Jan. 8, 2004

(65) Prior Publication Data

US 2005/0030620 A1     Feb. 10, 2005

(30) Foreign Application Priority Data

| Jun. 27, 2002 | (JP) | ............................. 2002-187514 |
| Apr. 2, 2003 | (JP) | ............................. 2003-099001 |

(51) Int. Cl.
  G03B 21/56  (2006.01)
  G02B 3/08   (2006.01)

(52) U.S. Cl. ..................... 359/460; 359/742

(58) Field of Classification Search ............... 359/457, 359/460, 742–743
See application file for complete search history.

(56) References Cited

U.S. PATENT DOCUMENTS

| 2004/0160681 A1* | 8/2004 | Sekiguchi et al. | .......... 359/742 |
| 2004/0169921 A1* | 9/2004 | Suzuki et al. | ............... 359/457 |
| 2005/0105177 A1* | 5/2005 | Suzuki et al. | ............... 359/457 |

FOREIGN PATENT DOCUMENTS

| EP | 0 241 986 | 10/1987 |
| JP | 61-208041 | 9/1986 |
| JP | 62-260102 | 11/1987 |
| JP | 2-132402 | 5/1990 |
| JP | 3-220542 | 9/1991 |
| JP | 7-49535 | 2/1995 |
| JP | 10-73808 | 3/1998 |
| JP | 2000-180967 | 6/2000 |
| WO | WO 01/04701 A1 | 1/2001 |

* cited by examiner

*Primary Examiner*—Christopher Mahoney
(74) *Attorney, Agent, or Firm*—Oliff & Berridge, PLC

(57) ABSTRACT

A projection screen 111 comprises a total reflection prism lens 114 and a lenticular lens 115 provided on the viewer's side of the total reflection prism lens 114. The total reflection prism lens 114 has a plurality of unit prisms 113 on its back surface (the outermost plane of incidence) on which imaging light L is incident. Each unit prism 113 has an apical angle $\lambda$ that corresponds to the angle between the plane of incidence 113$a$ and the plane of total reflection 113$b$, and the apical angles $\lambda$ of the unit prisms 113 vary with the position of each unit prism 113 on the screen plane. In particular, the unit prisms 113 have apical angles $\lambda$ varying continuously from 30° to 45° so that the apical angles $\lambda$ on the side distant from the center O of the concentric circles are greater than the apical angles $\lambda$ on the side close to this center O.

22 Claims, 18 Drawing Sheets

PROJECTION SCREEN AND PROJECTION DISPLAY

FIELD OF THE INVENTION

The present invention relates to a projection screen, especially a projection screen suitable for viewing imaging light that is obliquely projected on the screen from a cellular-structured imaging light source such as an LCD (Liquid Crystal Display) or DMD (Digital Micro-mirror Device), and to a projection display comprising the projection screen.

BACKGROUND ART

There has conventionally been known, as a display of rear projection type (rear projection type television), a projection display using three CRTs of red, green and blue colors as an imaging light source, in which imaging light emitted from such an imaging light source is projected on the back surface of a transmission projection screen to produce an image, which is viewed from the viewer's side.

A projection screen for use in such a projection display is usually composed of a Fresnel lens sheet and a lenticular lens sheet, and allows imaging light emitted from an imaging light source to form an image and to emerge toward viewers as directional diffused light.

Specifically, for example, a projection screen 300 comprises, as shown in FIG. 20, a Fresnel lens sheet 301 having a circular Fresnel lens 302 formed on its emergent side surface, and, on the viewer's side of the Fresnel lens sheet 301, a lenticular lens sheet 303 having a lenticular lens 304 for horizontal diffusion formed on its incident side surface. On the emergent side surface of the lenticular lens sheet 303 are provided lenses 305 from which light emerges and black stripes 306.

Of these, the Fresnel lens 302 on the Fresnel lens sheet 301 can be obtained by grooving a transparent resin material, such as an acrylic resin, at a predetermined angle and at a predetermined pitch, and has the function of condensing, toward the viewer's side, radially diffused imaging light that is emitted from an imaging light source (not shown in the figure) placed at the rear of the Fresnel lens sheet 301. The lenticular lens 304 on the lenticular lens sheet 303 can be obtained by forming cylindrical unit lenses so that they extend on one plane regularly and longitudinally, and has the function of diffusing, chiefly in the horizontal direction, the imaging light condensed by the Fresnel lens sheet 301 to let the light emerge as directional diffused light in the horizontal direction.

In the meantime, in place of the above-described projection display using three CRTs of red, green and blue colors, a projection display of single lens mode which uses a cellular-structured imaging light source such as an LCD or DMD and in which imaging light emitted from such an imaging light source is projected on the back surface of a transmission projection screen, the produced image being viewed from the viewer's side, has been increasingly demanded in recent years.

Heretofore, the projection mode usually adopted in such a projection display of single lens mode is that imaging light is projected on the projection screen from its rear almost vertically to the projection screen. The drawback of a projection display of this mode has been that since it requires a depth nearly equal to that of a conventional CRT projection display, it cannot be made smaller.

Under these circumstances, there has been proposed, as one of projection displays, a projection display in which imaging light emitted from an imaging light source is obliquely projected on a projection screen in order to make the display considerably smaller than conventional ones without impairing image quality (see Japanese Laid-Open Patent Publications No. 208041/1986 and No. 180967/2000).

Such a projection display has, on its incident side surface, a group of unit prisms with triangular cross sections (total reflection prism lens) as an optical means of condensing imaging light obliquely incident on the projection screen; the first plane (plane of incidence) of each unit prism refracts the incident imaging light, and the second plane (plane of total reflection) of the unit prism then totally reflects the refracted light to let the reflected light emerge from the emergent side surface of the projection display.

In the projection screen having such a total reflection prism lens, in the area on the side close to the imaging light source (in the case where the unit prisms concentrically extend around the center of the concentric circles that is not on the screen plane, in the area on the side close to this center of the concentric circles) in which the angle of incidence of imaging light (the angle of imaging light with the screen plane) gets smaller, part of imaging light incident on the plane of incidence 311a of each unit prism 311 of the total reflection prism lens 310 is not totally reflected at the plane of total reflection 311b of the unit prism 311 and, as shown in FIG. 21, passes through this plane to become stray light, causing such troubles as the formation of double image (ghost). In FIG. 21, reference character L11 denotes the light path of a component of imaging light that becomes ordinary light, and reference character L12 denotes the light path of a component of imaging light that becomes stray light. The amount of stray light thus produced is greater when each unit prism 311 has a larger apical angle λ, and is smaller when each unit prism 311 has a smaller apical angle λ.

On the other hand, in the projection screen having the above-described total reflection prism lens, in the area on the side distant from the imaging light source (in the case where the unit prisms concentrically extend around the center of the concentric circles that is not on the screen plane, in the area on the side distant from this center of the concentric circles) in which the angle of incidence of imaging light is great, each unit prism 311 has a smaller apical angle λ, and its plane of incidence 311a gets reverse tapered, as shown in FIG. 22. Therefore, there has been such a problem that part of imaging light incident on the plane of incidence 311a of each unit prism 311 is totally reflected at the plane of total reflection 311b of the unit prism 311 and is then reflected again at the plane of incidence 311a to become stray light, causing imaging light loss. In FIG. 22, reference character L21 denotes the light path of a component of imaging light that becomes ordinary light, and reference character L22 denotes the light path of a component of imaging light that becomes stray light. Further, there has been such a problem that, if the planes of incidence 311a of the unit prisms 311 are reverse tapered, it becomes difficult to make a mold for use in the molding of the unit prisms 311 and also to release the unit prisms from the mold in the lens molding process. Furthermore, in the case where the mold for use in the molding of the unit prisms 311 is produced by cutting a mold material, it is difficult to shape the mold correspondingly to the reverse tapered planes of incidence 311a of the unit prisms 311, and, moreover, the planes of incidence 311a of the unit prisms 311 become rough surfaces with flaws created in the course of cutting. A problem with this case has been as follows: both the area in which the planes of incidence 311a of the unit prisms 311 are mirror surfaces and the area in which the planes of incidence 311a of the unit prisms 311 are rough surfaces are to exist on the screen plane, so that the image produced on the screen plane appears differently at the boundary between these two areas and is thus observed as being uneven.

Thus, the conventional projection screens have the following drawback: since they have narrow allowable ranges of the angle of incidence of imaging light and tend to cause imaging light loss due to the production of stray light or the like, they easily undergo lowering of surface brightness or contrast.

SUMMARY OF THE INVENTION

The present invention has been accomplished in the light of the above-described drawback in the background art. An object of the present invention is to provide, by increasing the allowable range of the angle of incidence of imaging light that is a range in which imaging light loss due to the production of stray light or the like is not caused, a projection screen and a projection display that can display, without undergoing lowering of surface brightness or contrast, an image with high quality comparable to an image that is obtained when imaging light is projected on a projection screen almost vertically from an imaging light source.

The present invention provides a projection screen that allows imaging light obliquely projected from a projection optical system placed at the rear side of the projection screen to emerge toward the viewer's side of the projection screen, comprising a total reflection prism lens having a plurality of unit prisms provided on its back surface on which imaging light is incident, each unit prism having a first plane that refracts the incident light and a second plane that totally reflects the light refracted at the first plane, wherein each unit prism has an apical angle that corresponds to the angle between the first and second planes, and the apical angles of the unit prisms vary with the position of each unit prism on the screen plane.

In the present invention, it is preferable that the unit prisms concentrically extend around the center of the concentric circles that is not on the screen plane. Further, it is preferable that the unit prisms be made to have apical angles varying so that the apical angles on the side distant from the center of the concentric circles are greater than the apical angles on the side close to the center of the concentric circles. Furthermore, it is preferable that the unit prisms have apical angles varying from 30° to 45°. It is also preferable that the unit prisms have apical angles that vary continuously as the position of the unit prism varies from the side close to the center of the concentric circles to the side distant from this center.

In addition, in the present invention, it is preferable that the total reflection prism lens has: a first apical-angle-fixed area in which the unit prisms have apical angles fixed at a predetermined first angle; a second apical-angle-fixed area whose location is different from that of the first apical-angle-fixed area and in which the unit prisms have apical angles fixed at a predetermined second angle that is different from the first angle; and an apical-angle-varying area that is situated between the first and second apical-angle-fixed areas and in which the unit prisms have apical angles varying between the first and second angles with the position on the screen plane.

In the above case, it is preferable that the above-described apical-angle-varying area comprises a first apical-angle-varying part in which the unit prisms have apical angles that vary as only the angle between the first plane of the unit prism and the screen plane varies, with the angle between the second plane of the unit prism and the screen plane remaining unchanged. Further, it is preferable that the apical-angle-varying area further comprises a second apical-angle-varying part that is situated between the first apical-angle-varying part and the first apical-angle-fixed area and in which the unit prisms have apical angles that vary as both the angle between the first plane of the unit prism and the screen plane and the angle between the second plane of the unit prism and the screen plane vary; and a third apical-angle-varying part that is situated between the first apical-angle-varying area and the second apical-angle-fixed area and in which the unit prisms have apical angles that vary as both the angle between the first plane of the unit prism and the screen plane and the angle between the second plane of the unit prism and the screen plane vary.

Furthermore, in the present invention, it is preferable that the first plane of each unit prism has a draft angle of 0° or more to the perpendicular to the screen plane. Moreover, it is preferable that the first planes of the unit prisms have surface roughness that is uniform over the entire screen plane.

Furthermore, in the present invention, it is preferable that the projection screen further comprises a lenticular lens for diffusing light that has passed through the total reflection prism lens, provided on the viewer's side of the total reflection prism lens.

In this case, it is preferable that the lenticular lens has a plurality of unit lenses with half-elliptic or trapezoidal cross sections.

Preferably, the unit lenses with trapezoidal cross sections are arranged so that the lower base and upper base of each trapezoid face to the incident side and the emergent side, respectively; portions with V-shaped cross sections are created between each two neighboring unit lenses; the unit lenses are made from a material having a predetermined refractive index; those portions created between each two neighboring unit lenses are made from a material having a refractive index that is lower than that of the material for the unit lenses; and the interfaces between the unit prisms and the portions created between each two neighboring unit prisms allow light to be totally reflected. Further, it is preferable that the portions with V-shaped cross sections have the light-absorbing property of absorbing light entering from the viewer's side of the projection screen. Furthermore, it is preferable that the portions with V-shaped cross sections be made from a resin mixed with light-absorbing particles.

Furthermore, in the present invention, it is preferable that the total reflection prism lens and the lenticular lens be integrally made as one sheet.

Furthermore, in the present invention, it is preferable that the projection screen further comprises a diffusing sheet for diffusing light that has passed through the total reflection prism lens (or both the total reflection prism lens and the lenticular lens), provided on the viewer's side of the total reflection prism lens (or the lenticular lens).

Furthermore, in the present invention, it is preferable that the projection screen further comprises a functional layer comprising at least one layer selected from the group consisting of an antireflection layer, a hard coat layer, an antistatic layer, an anti-glaring layer, a stain-resistant layer, and a sensor layer.

The present invention also provides a projection display comprising the above-described projection screen and a projection optical system for obliquely projecting imaging light on the projection screen.

According to the present invention, in a projection screen on which imaging light is obliquely projected from a projection optical system that is placed at the rear side of the projection screen, by providing a total reflection prism lens having a plurality of unit prisms on its back surface on which imaging light is incident, it is possible to correct, only on the incident side (back surface side), the optical axis of imaging light obliquely projected from the projection optical system and let the imaging light emerge toward the viewer's side. In the present invention, the unit prisms are made to have apical angles varying with the position on the screen plane. Specifically, for example, in the case where the unit prisms extend concentrically around the center of the concentric circles that is not on the screen plane, the apical angles of the unit prisms are varied within a certain angle range (e.g., 30° or more and 45° or less) so that the apical angles on the side distant from the center of the concentric circles are greater than the apical angles on the side close to the center of the concentric circles. Namely, in the area on the side close to the projection optical system in which the angle of incidence of imaging light is small, the unit prisms are made to have smaller apical angles, while in the area on the side distant from the projection optical system in which the angle of incidence of imaging light is great, the unit prisms are made to have greater apical angles. For this reason, it is possible to increase the allowable range of the angle of incidence of imaging light that is a range in which imaging light loss due to the production of stray light or the like is not caused, and is thus possible to obtain a projection screen and a projection display that can display, without undergoing lowering of surface brightness or contrast, an image with high quality comparable to an image that is obtained when imaging light is projected on a projection screen almost vertically from a projection optical system.

Further, according to the present invention, by providing, on the total reflection prism lens, a first apical-angle-fixed area in which the unit prisms have apical angles fixed at a predetermined first angle, a second apical-angle-fixed area whose location is different from that of the first apical-angle-fixed area and in which the unit prisms have apical angles fixed at a predetermined second angle that is different from the first angle, and an apical-angle-varying area that is situated between the first and second apical-angle-fixed areas and in which the unit prisms have apical angles varying between the first and second angles with the position on the screen plane, it is possible to vary the apical angles of the unit prisms of the total reflection prism lens not over the entire screen plane but only partially. By this, it becomes possible to easily make a mold for use in the molding of the total reflection prism lens, and a projection screen and a projection display, both capable of ensuring high image quality, can thus be obtained more inexpensively.

Furthermore, according to the present invention, by providing, in the apical-angle-varying area on the total reflection prism lens, a first apical-angle-varying part in which the unit prisms have apical angles that vary as only the angle between the first plane of the unit prism and the screen plane varies, with the angle between the second plane of the unit prism and the screen plane remaining unchanged, and a second apical-angle-varying part and a third apical-angle-varying part between the first apical-angle-varying part and the first apical-angle-fixed area and between the first apical-angle-varying part and the second apical-angle-fixed area, respectively, in which the unit prisms have apical angles that vary as both the angle between the first plane and the screen plane and the angle between the second plane and the screen plane vary, it is possible to further make the boundaries between the above areas appear unclear, and is thus possible to attain higher image quality.

Furthermore, according to the present invention, by making the first plane of each unit prism have a draft angle of 0° or more to the perpendicular (normal) to the screen plane, it is possible to prevent production of stray light, and is thus possible to prevent imaging light loss. In addition, in this case, since the mold for use in the molding of the unit prisms includes no reverse tapered portions, it is easy to make the mold, and, moreover, the unit prisms can be easily released from the mold in the lens molding process.

Furthermore, according to the present invention, by making the surface roughness of the first planes of the unit prisms uniform over the entire screen plane, it is possible to prevent occurrence of unevenness in an image on the screen plane so that a high-quality image can be viewed.

DETAILED DESCRIPTION OF THE INVENTION

By referring to the accompanying drawings, embodiments of the present invention will be described hereinafter.

FIRST EMBODIMENT

First of all, a projection screen according to the first embodiment of the present invention and a projection display comprising it will be described with reference to FIGS. 1 to 10.

Figure 1:
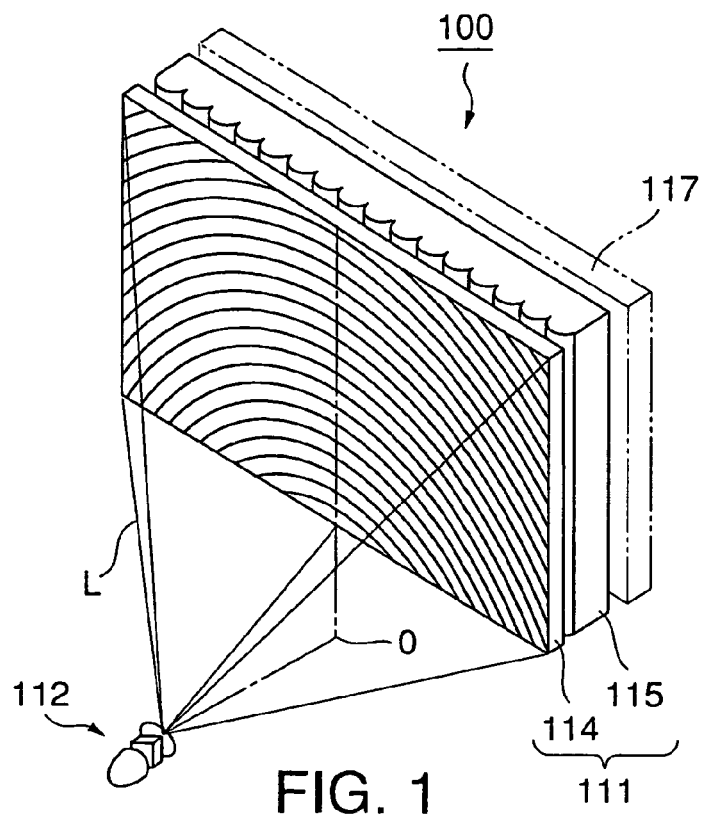
FIG. 1 is a diagrammatic perspective view showing a projection display comprising a projection screen according to the first embodiment of the present invention.

As shown in FIG. 1, a projection display 100 according to the first embodiment of the present invention comprises a projection screen 111 and a projection optical system 112 from which imaging light L is obliquely projected on the projection screen 111. The projection optical system 112 comprises an imaging light source composed of an LCD, DMD, or the like, and an optical system for spreading the imaging light emitted from the imaging light source.

The projection screen 111 is for letting imaging light L obliquely projected from the projection optical system 112 placed at its rear side emerge toward the viewer's side, and comprises a total reflection prism lens 114, and a lenticular lens 115 provided on the viewer's side of the total reflection prism lens 114.

Figure 2:
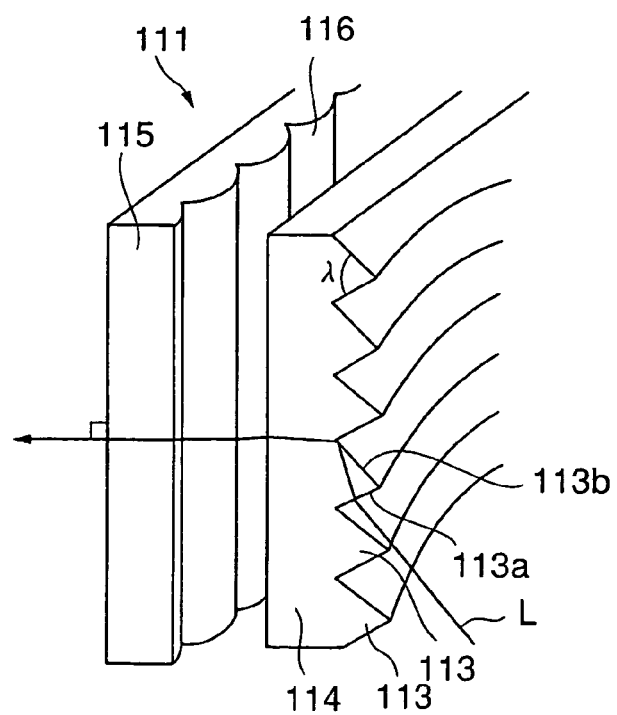
FIG. 2 is a perspective view showing the principal part of the projection screen shown in FIG. 1.

Of these components, the total reflection prism lens 114 is for refracting and condensing imaging light L projected from the projection optical system 112, and, as shown in FIG. 2, has a plurality of unit prisms 113 on its back surface (the outermost plane of incidence) on which the imaging light L is incident.

Each unit prism 113 has a plane of incidence (first plane) 113a that refracts incident light, and a plane of total reflection (second plane) 113b that totally reflects the light refracted at the plane of incidence 113a. The unit prism 113 can therefore refract and totally reflect obliquely projected imaging light L to let the light travel in the direction nearly vertical to the screen plane. The unit prisms 113 are made as prisms in the shape of circular arcs extending concentrically around the center O of the concentric circles that is not on the screen plane (see FIG. 1). Specifically, for example, it is preferable that the prism pitch of the unit prisms 113 be from 100 to 200 µm and that the height of each unit prism 113 be from 150 to 300 µm.

Each unit prism 113 has an apical angle λ that corresponds to the angle between the plane of incidence 113a and the plane of total reflection 113b, and the apical angles λ of the unit prisms 113 vary according to the position of each unit prism 113 on the screen plane. In particular, it is preferable that the unit prisms 113 have apical angles λ continuously varying from 30° to 45° so that the apical angles λ on the side distant from the center O of the concentric circles (the upper side in the figure) are greater than the apical angles λ on the side close to the center O of the concentric circles (the lower side in the figure).

On the other hand, the lenticular lens 115 is for horizontally diffusing light that has passed through the total reflection prism lens 114, and has a plurality of cylindrical unit lenses 116 on its incident side from which imaging light L enters. Specifically, for example, each unit lens 116 has preferably a half-elliptic cross section with a transverse diameter of 140 µm and a longitudinal diameter of 100 µm; the lens pitch is preferably 140 µm; the height of each unit lens is preferably 50 µm; and the angle of horizontal diffusion is preferably from 20 to 50° when expressed by half angle (the angle at which the brightness observed from a certain direction becomes a half of the brightness observed from the front).

As shown in FIGS. 1 and 2, the total reflection prism lens 114 and the lenticular lens 115 are made as separate sheets (a prism sheet and a lenticular lens sheet). Moreover, in FIGS. 1 and 2, the total reflection prism lens 114 and the lenticular lens 115 are, for easy understanding, depicted as being separated more than the actual distance between them.

Next, the light path of imaging light L in the total reflection prism lens 114 of the projection screen 111 shown in FIG. 1 will be explained with reference to FIG. 3.

Figure 3:
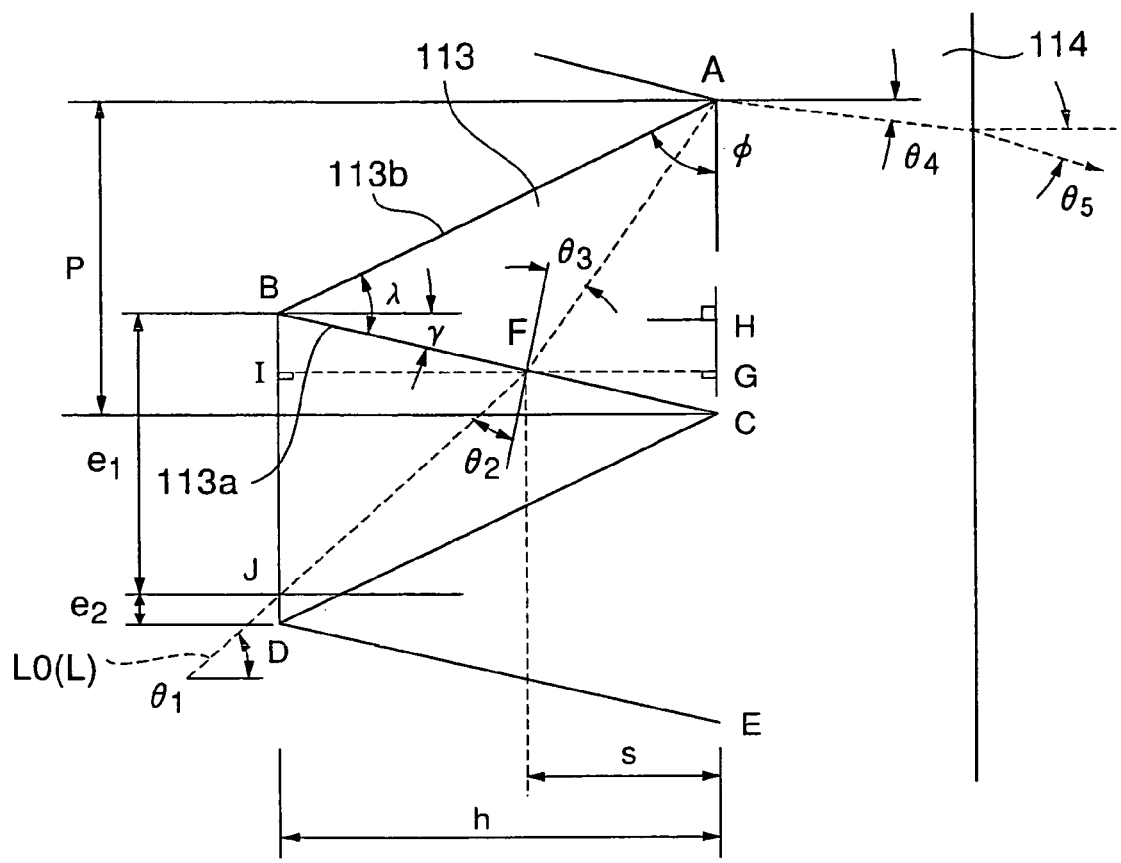
FIG. 3 is an illustration for explaining the light path of imaging light in the total reflection prism lens of the projection screen shown in FIG. 1.

As shown in FIG. 3, imaging light L emitted from the projection optical system (see reference numeral 112 in FIG. 1) is incident on the plane of incidence 113a of each unit prism 113 of the total reflection prism lens 114 at an angle of incidence $\theta_1$ that varies depending upon the position of the unit prism 113 on the screen plane. It is preferable that the angle of incidence $\theta_1$ at which imaging light L is incident on the unit prism situated at the edge of the screen plane on the side close to the projection optical system (on the side close to the center O of the concentric circles) be made 35° or more (preferably 45° or more) and 50° or less.

The imaging light L incident on the plane of incidence 113a of each unit prism 113 is refracted at the plane of incidence 113a and then totally reflected at the plane of total reflection 113b, and this totally reflected light travels toward the viewer's side in the direction nearly vertical to the screen plane.

To attain the above-described light path of imaging light L, the shape of each unit prism 113 is determined according to the angle of incidence $\theta_1$ of imaging light L. Specifically, when the lens angle of each unit prism 113 (the angle between the plane of total reflection 113b and the screen plane) is denoted by φ; the apical angle of the unit prism 113, by λ; the refractive index of the material for the total reflection prism lens 114, by n; and the angle between imaging light L reflected at the plane of total reflection 113b of the unit prism 113 and the normal to the screen plane, by $\theta_4$, the shape of the unit prism 113 can be determined by the following Eq. (1):

$$\tan \phi = \{n \sin(\lambda+\theta_4)+\sin(\lambda+\theta_1)\}/\{n \cos(\lambda+\theta_4)-\cos(\lambda+\theta_1)\}. \quad (1)$$

Further, if the emergent side surface of the total reflection prism lens 114 is flat, the following Eq. (2) holds between the angle $\theta_4$ at which imaging light L travels in the total reflection prism lens 114 and the angle $\theta_5$ at which the imaging light L emerges from the total reflection prism lens 114:

$$\sin \theta_4 = \sin \theta_5/n. \quad (2)$$

When the angle between the plane of incidence 113a of each unit prism 113 and the normal to the screen plane is denoted by $\gamma$, this angle is preferably as follows:

$$\gamma = \phi + \lambda - \pi/2 \geq 0. \quad (3)$$

The reason for this is as follows: when the angle $\gamma$ of the plane of incidence 113a of each unit prism 113 is negative, the plane of incidence 113a of the unit prism 113 gets reverse tapered; in this case, it is difficult to make a mold for use in the molding of the unit prisms 113 and also to obtain the unit prisms 113 by molding using a mold.

The lens angle $\phi$ of each unit prism 113 decreases monotonically relative to the angle of incidence $\theta_1$ of imaging light L, so that the angle $\gamma$ of the plane of incidence 113a of each unit prism 113 tends to become negative in the area on the screen plane in which the angle of incidence $\theta_1$ of imaging light L is great (the area on the side distant from the center O of the concentric circles). The conditions under which the plane of incidence 113a of each unit prism 113 does not get reverse tapered when the angle $\theta_4$ at which imaging light L travels in the total reflection prism lens 114 is nearly equal to 0 are given by the following formula (4):

$$\cos^{-1}\{\cos(\theta_1)/n\}/2 \leq \lambda. \quad (4)$$

On the other hand, in the area on the screen plane in which the angle of incidence $\theta_1$ of imaging light L is small (the area on the side close to the center O of the concentric circles), part of imaging light L incident on the plane of incidence 113a of each unit prism 113 is not totally reflected at the plane of total reflection 113b and passes through this plane to become stray light.

In order to explain how stray light is produced in each unit prism 113, basic imaging light $L_0$ that has been refracted at the plane of incidence 113a of the unit prism 113 and then travels toward the very base of the unit prism 113 (i.e., imaging light that passes through the boundary between the part of one unit prism 113, imaging light L that has passed through this part becoming stray light, and the other part of the unit prism 113, imaging light L that has passed through this part becoming useful light) will now be reviewed.

When the angle of incidence at which imaging light L is incident on the plane of incidence 113a of each unit prism 113 is denoted by $\theta_2$; the angle at which the imaging light L is refracted at the plane of incidence 113a of the unit prism 113, by $\theta_3$; the prism pitch of the unit prisms 113, by p; the width of the part in which the imaging light L is totally reflected at the plane of total reflection 113b of the unit prism 113 and is suitably used as useful light, by $e_1$; the width of the part in which the imaging light L is not totally reflected at the plane of total reflection 113b of the unit prism 113 and passes through this plane to become stray light, by $e_2$; the height of the unit prism 113, by h; and the height of the boundary between the part of the plane of incidence 113a of the unit prism 113, in which the imaging light L that has passed through this part becoming stray light, and the other part of the plane of incidence 113a of the unit prism 113, in which the imaging light L that has passed through this part becoming useful light, by s, the width $e_1$ of the part in which the imaging light L becomes useful light is given by the following Eq. (5):

$$e_1 = (h-s) \times (\tan(\phi+\lambda-\pi/2)+\tan \theta_1). \quad (5)$$

h and s in the above Eq. (5) are given by the following Eqs. (6) and (7), respectively:

$$h = p \times \tan(\phi+\lambda) \times \tan \phi/(\tan(\phi+\lambda)-\tan \phi); \quad (6)$$

$$s = -p \times \tan(\phi+\lambda)/(1+\tan(\phi+\lambda) \times \tan(\phi+\lambda+\theta_3)), \quad (7)$$

where $\theta_3 = \sin^{-1}\{\sin(\theta_1+\phi+\lambda)/n\}. \quad (8)$

As is clear from FIG. 3, the relationship between the prism pitch p and the width $e_1$ of the part in which imaging light L becomes useful light is $e_1 \leq p$. Further, the ratio $e_1/p$ of the width $e_1$ of the part in which imaging light L becomes useful light to the lens pitch p increases as the angle of incidence $\theta_1$ of imaging light L increases, and at a certain point, $e_1$ becomes equal to p. In this case, in the region in which the angle of incidence $\theta_1$ of imaging light L is greater than that at the point at which $e_1 = p$, imaging light L incident on the plane of incidence 113a of the unit prism 113 is totally reflected at the plane of total reflection 113b, and no stray light exists.

As explained above, the area on the screen plane in which the angle of incidence $\theta_1$ of imaging light L is small (the area on the side close to the center O of the concentric circles) has the problem that part of imaging light L incident on the plane of incidence 113a of each unit prism 113 is not totally reflected at the plane of total reflection 113b and passes through this plane to become stray light, while the area on the screen plane in which the angle of incidence $\theta_1$ of imaging light L is great (the area on the side distant from the center O of the concentric circles) has the problem that the plane of incidence 113a of each unit prism 113 gets reverse tapered.

Figure 4:
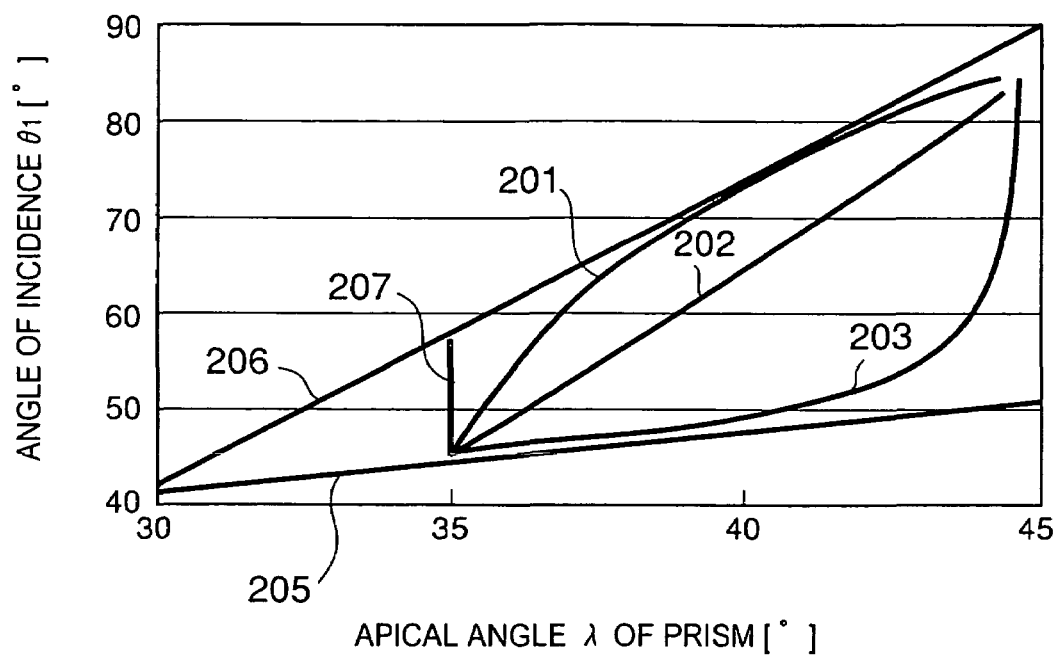
FIG. 4 is a diagram for explaining the relationship between the apical angle of each unit prism and the angle of incidence of imaging light in the total reflection prism lens of the projection screen shown in FIG. 1.

FIG. 4 is a diagram for explaining the relationship between the apical angle $\lambda$ of each unit prism 113 and the angle of incidence $\theta_1$ of imaging light L in the total reflection prism lens 114 of the projection screen 111 shown in FIG. 1.

In FIG. 4, line 205 shows the boundary of production of stray light in each unit prism 113, defined by the above Eq. (5) to Eq. (8), in the case where the angle $\theta_4$ at which imaging light L travels in the total reflection prism lens 114 (i.e., the angle of emergence $\theta_5$ at which imaging light L emerges from the total reflection prism lens 114) is 0; and line 206 shows the boundary of formation of a reverse tapered plane of incidence 113a of each unit prism 113, defined by the above Eq. (4), in the same case. These lines 205 and 206 are obtained under the condition that the refractive index n of the material for the total reflection prism lens 114 is 1.55.

In the inner region surrounded by the two lines 205 and 206 in FIG. 4, there are no such problems that part of imaging light L incident on the plane of incidence 113a of each unit prism 113 is not reflected at the plane of total reflection 113b and passes through this plane to become stray light and that the plane of incidence 113a of each unit prism 113 gets reverse tapered. Therefore, as long as the apical angle $\lambda$ of each unit prism 113 and the angle of incidence $\theta_1$ of imaging light L that varies according to the position of the unit prism 113 on the screen plane are present in this region, neither the stray light problem nor the reverse tapered plane problem occurs. Specifically, for example, in the case where the unit prisms 113 have a fixed apical angle of 35°, if the angle of incidence $\theta_1$ of imaging light L is in the range of 45 to 60°, neither the stray light problem nor the reverse tapered plane problem occurs (see reference numeral 207).

In recent years, there is the trend to make the projection screen 111 larger, and in line with this trend, the range of the angle of incidence $\theta_1$ of imaging light L has increased. Therefore, if the unit prisms 113 have a fixed apical angle $\lambda$, the angle of incidence $\theta_1$ of imaging light L tends to get out of the inner region surrounded by the lines 205 and 206 in both the area on the screen plane in which the angle of incidence $\theta_1$ of imaging light L is small and the area on the screen plane in which the angle of incidence $\theta_1$ of imaging light L is great.

To overcome the stray light problem in the above-described case, it is effective to lower the lower limit of the allowable range of the angle of incidence $\theta_1$ of imaging light L, defined by the line 205. To attain this, it is preferable that the unit prisms 113 situated in the area on the screen plane in which the angle of incidence $\theta_1$ of imaging light L is small (the area on the side close to the center O of the concentric circles) be made to have smaller apical angles $\lambda$. On the other hand, to overcome the reverse tapered plane problem, it is effective to raise the upper limit of the allowable range of the angle of incidence $\theta_1$ of imaging light L, defined by the line 206. To attain this, it is preferable that the unit prisms 113 situated in the area on the screen plane in which the angle of incidence $\theta_1$ of imaging light L is great (the area on the side distant from the center O of the concentric circles) be made to have greater apical angles $\lambda$.

Figure 5:
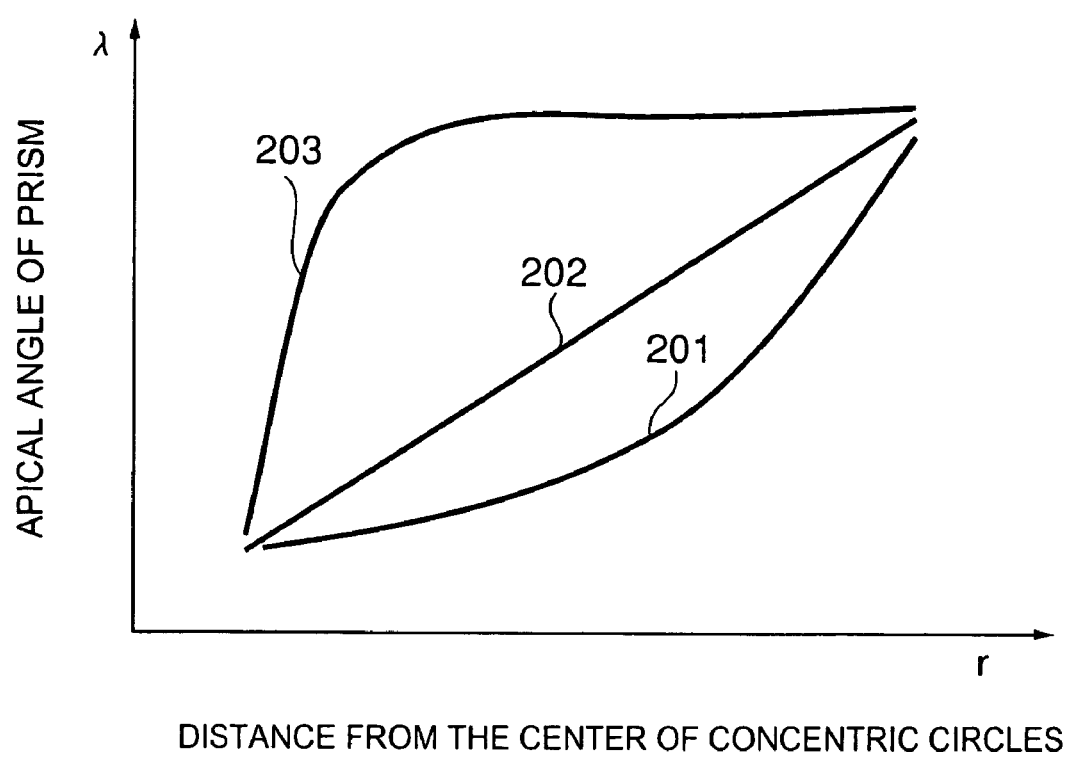
FIG. 5 is a diagram for explaining the relationship between the position and apical angle of each unit prism in the total reflection prism lens of the projection screen shown in FIG. 1.

For this reason, in this embodiment, the unit prisms 113 are, over the entire screen plane, made to have apical angles $\lambda$ continuously varying so that the apical angles $\lambda$ on the side distant from the center O of the concentric circles are greater than the apical angles $\lambda$ on the side close to the center O of the concentric circles (see reference numerals 201 to 203). By this, it is possible to increase the allowable range of the angle of incidence $\theta_1$ of imaging light L, and is thus possible to make the entire screen plane free from both the stray light problem and the reverse tapered plane problem. Lines 201 to 203 in FIG. 4 show variations in the apical angle $\lambda$ of the unit prism 113 in terms of the angle of incidence $\theta_1$ of imaging light L. It is, however, a matter of course that variation in the apical angle $\lambda$ of the unit prism 113 can also be shown in terms of the position of the unit prism 113 (the distance from the center O of the concentric circles), and this is as shown in FIG. 5.

In the above-described embodiment, it is preferable that the plane of incidence 113$a$ of each unit prism 113 has a draft angle of 0° or more (preferably $\frac{1}{1000}$° or more) to the perpendicular (normal) to the screen plane (the inclination with which the angle $\gamma$ between the plane of incidence 113$a$ and the normal to the screen plane is positive). Further, it is preferable that the surface roughness of the planes of incidence 113$a$ of the unit prisms 113 is uniform over the entire screen plane.

(First Modification)

The above embodiment has been described with reference to the case where the apical angles $\lambda$ of the unit prisms 113 are varied continuously over the entire screen plane. The present invention is not limited to this, and the apical angles $\lambda$ of the unit prisms 113 may also be varied step-wise within the screen plane.

The first modification of the projection screen 111 shown in FIGS. 1 to 5 will be described with reference to FIGS. 6A, 6B, 7 and 8. Since the basic construction of this first modification is the same as that of the projection screen 111 shown in FIGS. 1 to 5, emphasis is, in the following description, laid on those points distinct from the projection screen 111 shown in FIGS. 1 to 5.

Figure 6B:
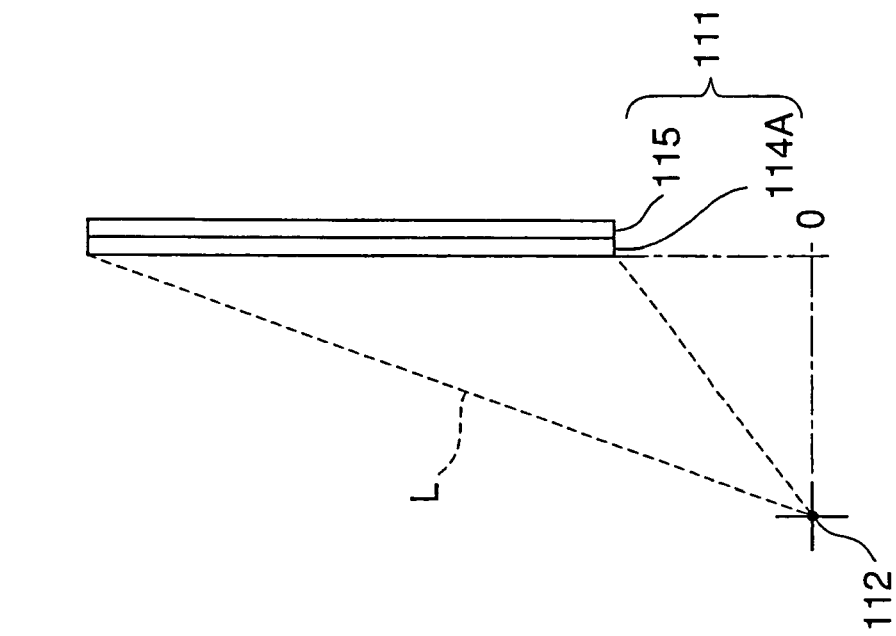
FIGS. 6A and 6B are views for explaining the first modification of the projection screen shown in FIGS. 1 to 5.
Figure 6A:
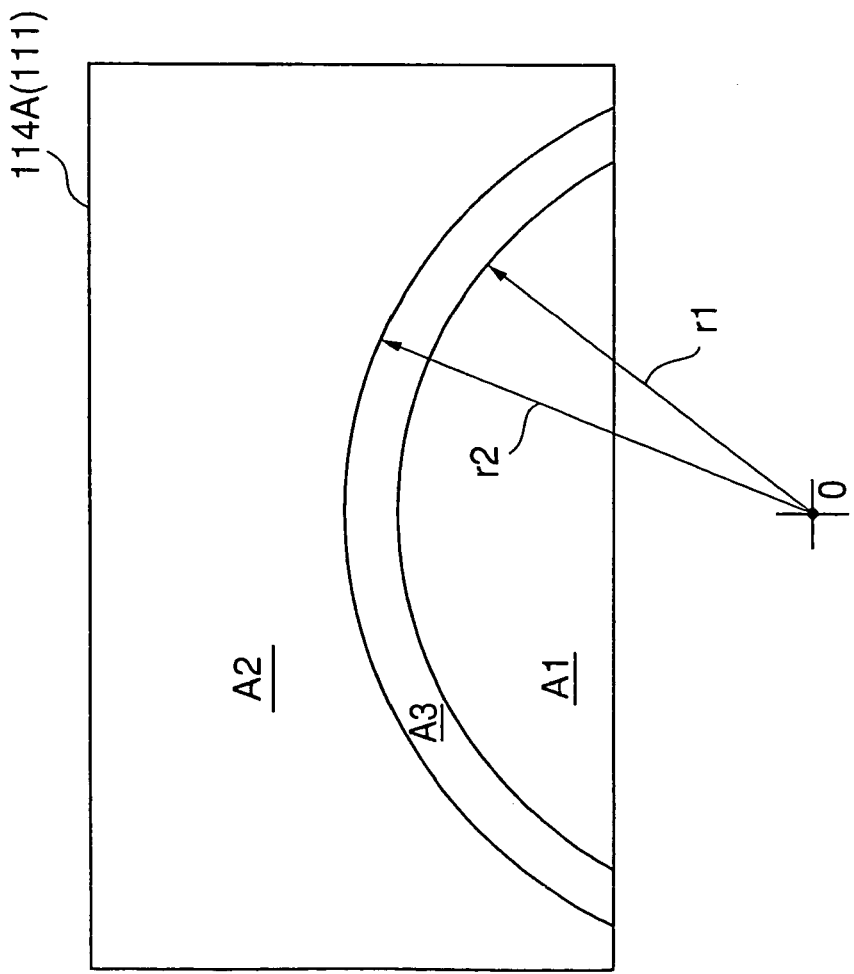

FIG. 6A is a view of a projection screen 111 according to the first modification, viewed from the incident side of the screen, and FIG. 6B is a view of the projection screen 111 according to the first modification (and a projection optical system 112), viewed from the side of the screen.

As shown in FIGS. 6A and 6B, the projection screen 111 according to the first modification comprises a total reflection prism lens 114A having a plurality of unit prisms formed on its back surface (the outermost plane of incidence) side from which imaging light L enters, and, on the viewer's side of the total reflection prism lens 114A, a lenticular lens 115.

As in the case of the total reflection prism lens 114 in the projection screen 111 shown in FIGS. 1 to 5, the unit prisms of the total reflection prism sheet 114A concentrically extend around the center O of the concentric circles that is not on the screen plane. Further, the projection optical system 112 is placed at the same height as that of the center O of the concentric circles that is not on the screen plane, as shown in FIG. 6B.

The total reflection prism lens 114A is divided into three areas A1, A2 and A3 according to the distance from the center O of the concentric circles.

Of these areas, the area A1 is a first apical-angle-fixed area situated in the position closer to the center O of the concentric circles than distance r1 from the center O of the concentric circles, and, in this area, the apical angles $\lambda$ of the unit prisms are fixed at $\lambda 1$ (first angle).

The area A2 is a second apical-angle-fixed area situated in the position more distant from the center O of the concentric circles than distance r2 from the center O of the concentric circles, and, in this area, the apical angles $\lambda$ of the unit prisms are fixed at $\lambda 2$ (second angle). If $\lambda 1$ and $\lambda 2$ are compared, $\lambda 2$ is greater than $\lambda 1$ ($\lambda 2 > \lambda 1$).

The area A3 is an apical-angle-varying area situated between the areas A1 and A2 (in the position more distant from the center O of the concentric circles than distance r1 from the center O of the concentric circles, and closer to the center O of the concentric circles than distance r2 from the center O of the concentric circles), and, in this area, the unit prisms have apical angles $\lambda$ varying between $\lambda 1$ and $\lambda 2$ with the position on the screen plane.

Figure 7:
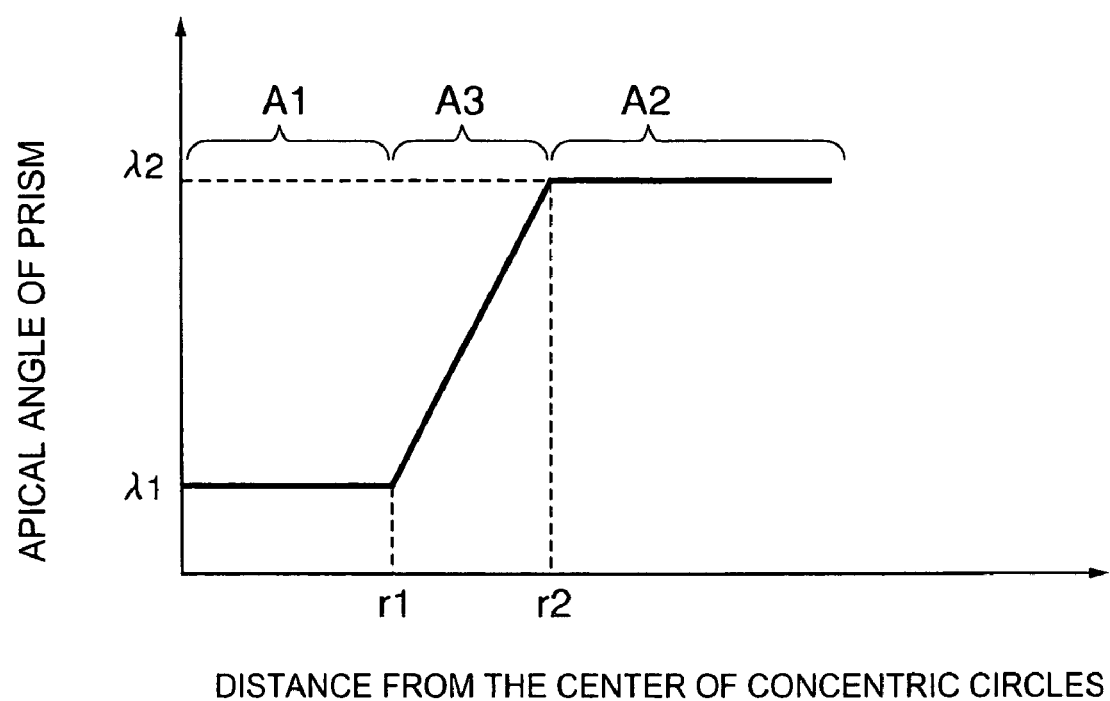
FIG. 7 is a diagram for explaining the relationship between the position and apical angle of each unit prism in the total reflection prism lens of the projection screen shown in FIGS. 6A and 6B.

FIG. 7 shows how the apical angles $\lambda$ of the unit prisms vary in the areas A1, A2 and A3.

In the area A3, the apical angles $\lambda$ of the unit prisms gradually vary from $\lambda 1$ to $\lambda 2$ as the angle between the plane of incidence (see reference numeral 113$a$ in FIG. 3) of the unit prism and the screen plane gradually varies, with the angle between the plane of total reflection of the unit prism (see reference numeral 113$b$ in FIG. 3) and the screen plane remaining unchanged.

If only the areas A1 and A2 are provided without providing the area A3, the apical angles $\lambda$ of the unit prisms are to sharply vary from $\lambda 1$ to $\lambda 2$ at a certain point on the screen plane. In this case, not only the apical angles $\lambda$ of the unit prisms but also the angles of the planes of total reflection of the unit prisms (lens angles $\phi$) are, of course, to vary sharply.

In particular, with respect to variation in the lens angle $\phi$ of the unit prism, the lens angles $\phi$ of the unit prisms that are gradually getting smaller as the position of the unit prism varies from the side close to the center O of the concentric circles to the side distant from this center O sharply vary at the point. There is therefore a possibility that the boundary between the two areas A1 and A2 is unfavorably observed when the produced image is viewed.

On the contrary, in the above-described first modification, the area A3 in which the unit prisms have apical angles $\lambda$ varying between $\lambda 1$ and $\lambda 2$ with the position on the screen plane is provided between the areas A1 and A2 in which the unit prisms have apical angles $\lambda$ fixed at $\lambda 1$ and $\lambda 2$, respectively, so that the variation in the apical angle $\lambda$ of the unit prism becomes continuous. Further, in the area A3, the unit prisms are made to have apical angles $\lambda$ that are varied by varying the angle between the plane of incidence of the unit prism and the screen plane without varying the angle between the plane of total reflection of the unit prism and the screen plane (lens angle $\phi$), so that there is no possibility that the variation in the angle of the plane of total reflection is partly retrogressed.

Figure 8:
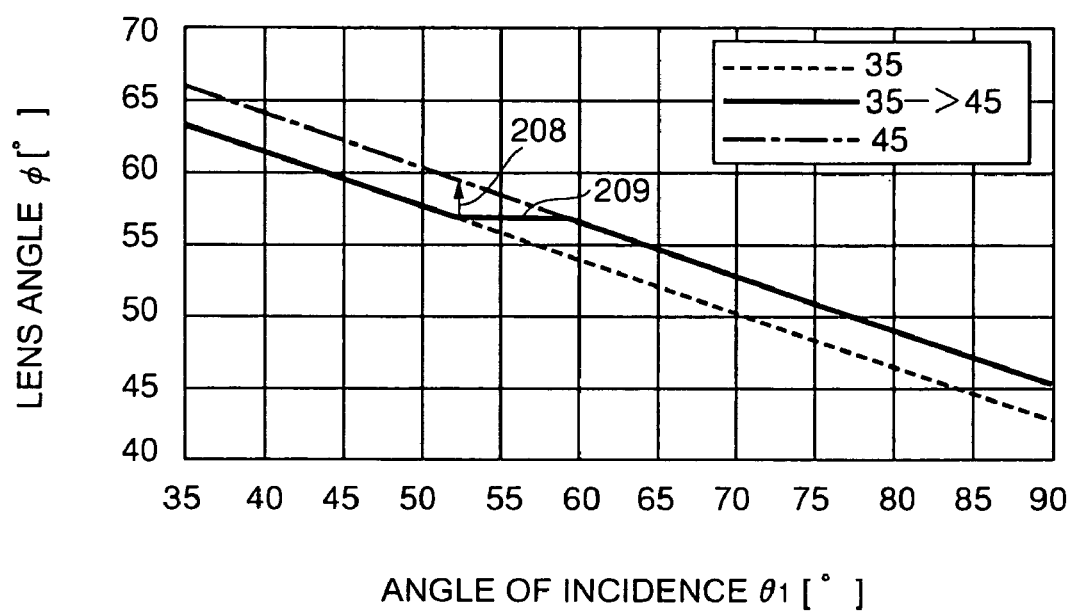
FIG. 8 is a diagram showing the relationship between the angle of incidence of imaging light and the lens angle of each unit prism in the total reflection prism lens of the projection screen shown in FIGS. 6A and 6B.
Figure 9:
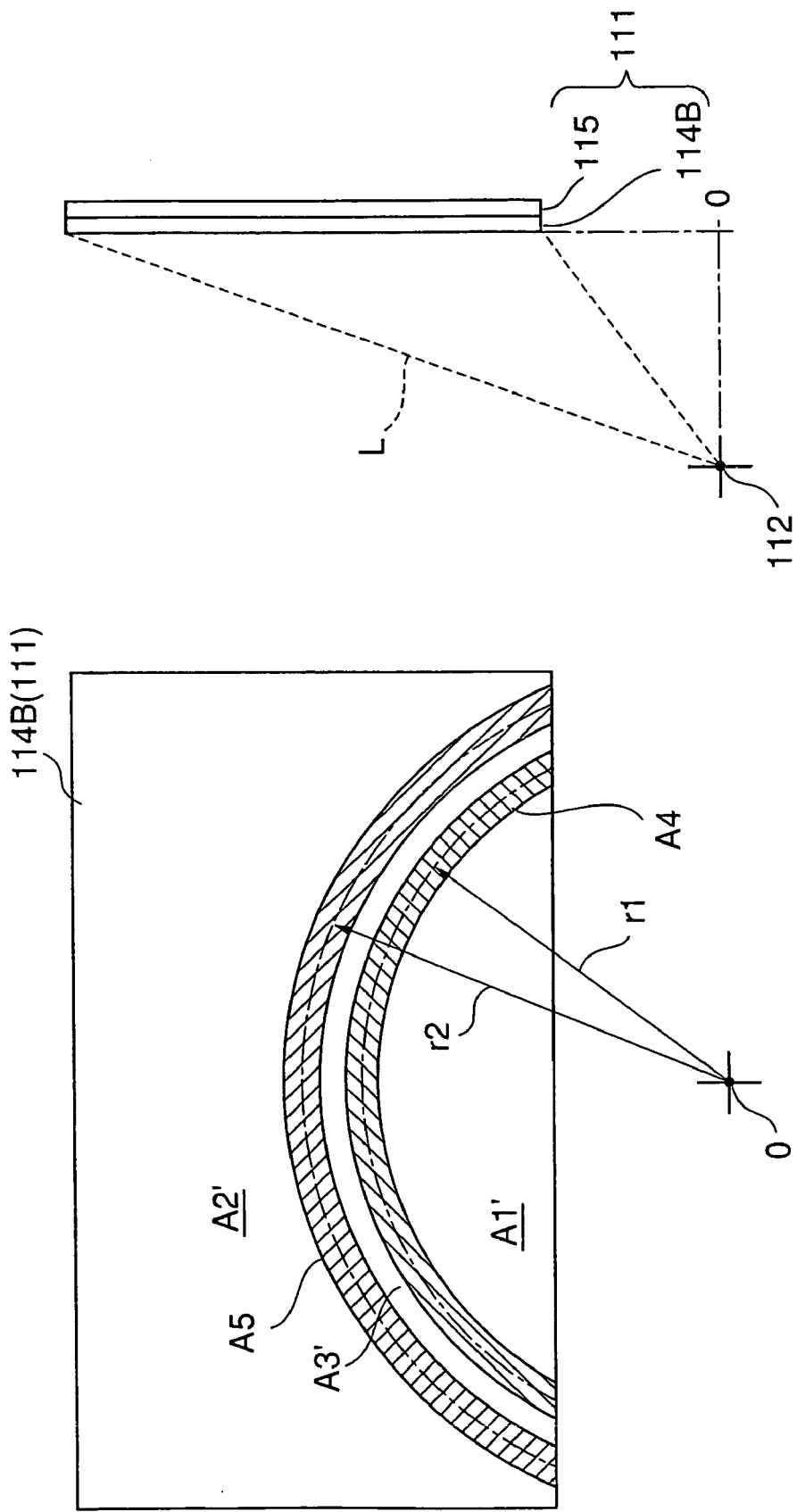
FIGS. 9A and 9B are views for explaining the second modification of the projection screen shown in FIGS. 1 to 5.

FIG. 8 is a diagram specifically showing the relationship between the angle of incidence $\theta_1$ of imaging light L and the lens angle $\phi$ of each unit prism in the total reflection prism lens 114A in the case where the angle $\theta_4$ at which imaging light L travels in the total reflection lens 114A is 0 (i.e., the angle of emergence $\theta_5$ at which imaging light L emerges from the total reflection prism lens 114A is 0).

Now suppose, as shown in FIG. 8, that the apical angle $\lambda$ of each unit prism in the area A1 situated on the side close to the center O of the concentric circles is $\lambda 1$ (=35°) and that the apical angle $\lambda$ of each unit prism in the area A2 situated on the side distant from the center O of the concentric circles is $\lambda 2$ (=45°). In this case, if the apical angle $\lambda$ of the unit prism is sharply varied when the angle of incidence $\theta_1$ is 52.5°, the angle of the plane of total reflection (lens angle $\phi$), which is gradually getting smaller as the position of the unit prism gets farther in the direction from the side close to the center O of the concentric circles to the side distant from this center O, sharply increases by 2.6° at this point (see reference numeral 208). Therefore, there is a possibility that this boundary is unfavorably observed when the produced image is viewed.

On the contrary, in the above-described first modification, the apical angle $\lambda$ of the unit prism is, for example, varied from $\lambda 1$ (=35°) to $\lambda 2$ (=45°) by varying, in the region in which the angle of incidence $\theta_1$ of imaging light L is between 52.5° and 59.2°, only the angle of the plane of incidence of each unit prism, with the angle of the plane of total reflection of each unit prism (lens angle $\phi$) fixed at 57°, as shown by the solid line in FIG. 8 (see reference numeral 209). Therefore, there is no possibility that the variation in the angle of the plane of total reflection of each unit prism is partly retrogressed.

(Second Modification)

Next, the second modification of the projection screen 111 shown in FIGS. 1 to 5 will be described with reference to FIGS. 9A, 9B and 10. The second modification is a further modification of the above-described first modification, which can further ensure that the variation in the apical angle $\lambda$ of each unit prism is not perceived. Since the basic construction of the second modification is the same as that of the first modification described above, emphasis is, in the following description, laid on those points distinct from the first modification.

FIG. 9A is a view of a projection screen 111 according to the second modification, viewed from the incident side of the screen, and FIG. 9B is a view of the projection screen 111 according to the second modification (and a projection optical system 112), viewed from the side of the screen.

As shown in FIGS. 9A and 9B, the projection screen 111 comprises a total reflection prism lens 114B having a plurality of unit prisms formed on its back surface (the outermost plane of incidence) on which imaging light L is incident, and, on the viewer's side of the total reflection prism lens 114B, a lenticular lens 115.

As in the case of the total reflection prism lens 114 of the projection screen 111 shown in FIGS. 1 to 5, the total reflection prism lens 114B concentrically extends around the center O of the concentric circles that is not on the screen plane. Further, the projection optical system 112 is placed at the same height as that of the center O of the concentric circles that is not on the screen plane, as shown in FIG. 9B.

The total reflection prism lens 114B includes areas A1', A2' and A3' that correspond to the areas A1, A2 and A3 in the above-described first modification, respectively.

Namely, the area A1' is a first apical-angle-fixed area situated in the position closer to the center O of the concentric circles than distance r1 from the center O of the concentric circles, and, in this area, the unit prisms have apical angles $\lambda$ that are fixed at $\lambda 1$ (first angle).

The area A2' is a second apical-angle-fixed area situated in the position more distant from the center O of the concentric circles than distance r2 from the center O of the concentric circles, and, in this area, the unit prisms have apical angles $\lambda$ that are fixed at $\lambda 2$ (second angle). If $\lambda 1$ and $\lambda 2$ are compared, $\lambda 2$ is greater than $\lambda 1$ ($\lambda 2 > \lambda 1$).

The area A3' is a first apical-angle-varying part situated between the areas A1' and A2' (in the position more distant from the center O of the concentric circles than distance r1 from the center O of the concentric circles, and closer to the center O of the concentric circles than distance r2 from the center O of the concentric circles), and, in this area, the unit prisms have apical angles $\lambda$ varying between $\lambda 1$ and $\lambda 2$ with the position on the screen plane.

Area A4 with a predetermined width is provided at the boundary between the areas A1' and A3', and area A5 with a predetermined width is also provided at the boundary between the areas A3' and A2'. For this reason, the areas A1', A2' and A3' in the second modification are narrower than the areas A1, A2 and A3 in the first modification, respectively, due to the existence of the areas A4 and A5.

The area A4 is a second apical-angle-varying part situated between the areas A1' and A3', and, in this area, the unit prisms have apical angles $\lambda$ varying with the position on the screen plane.

The area A5 is a third apical-angle-varying part situated between the areas A3' and A2', and, in this area, the unit prisms have apical angles $\lambda$ varying with the position on the screen plane.

The area A3' that is the first apical-angle-varying part, the area A4 that is the second apical-angle-varying part, and the area A5 that is the third apical-angle-varying part constitute the apical-angle-varying area.

Figure 10:
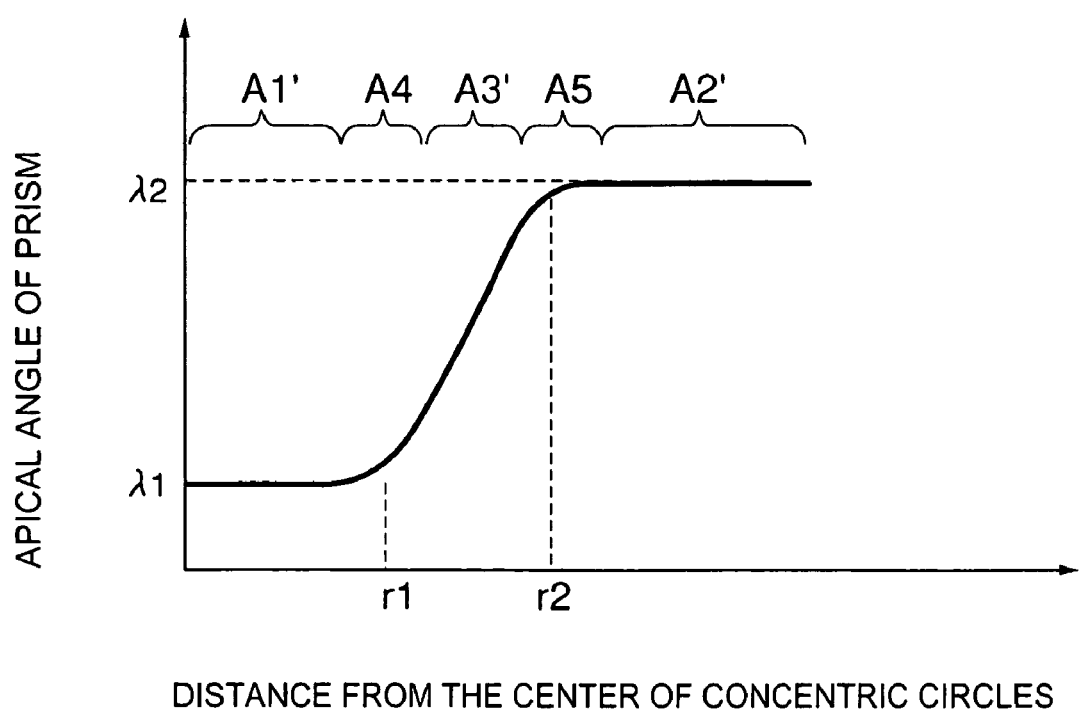
FIG. 10 is a diagram for explaining the relationship between the position and apical angle of each unit prism in the total reflection prism lens of the projection screen shown in FIGS. 9A and 9B.

FIG. 10 shows how the apical angles $\lambda$ of the unit prisms vary in the areas A1', A2', A3', A4 and A5.

In the area A3 in the above-described first modification, the unit prisms have apical angles $\lambda$ that vary gradually from $\lambda 1$ to $\lambda 2$ as the angle between the plane of incidence (see reference numeral 113a in FIG. 3) of the unit prim and the screen plane gradually varies, with the angle between the plane of total reflection (see reference numeral 113b in FIG.

3) and the screen plane remaining unchanged. However, even in this case, the variations in the angle of the plane of total reflection (lens angle φ) are great at the boundaries between the areas A3 and A1 and between the areas A3 and A2 as compared with the other parts. There is therefore a possibility that, depending on the design of the shape of each unit prism, the boundaries between these areas are clearly observed when the produced image is viewed.

For this reason, in the second embodiment, the areas A4 and A5 with predetermined widths are provided at the boundaries between the areas A3 and A1 and between the areas A3 and A2, respectively, and, in these areas A4 and A5, the apical angle λ of each unit prism is varied by varying not only the angle between the plane of incidence and the screen plane but also the angle between the plane of total reflection and the screen plane (lens angle φ). By this, it is possible to make the variation in the angle of the plane of total reflection smooth, and is thus possible to prevent the boundaries between the above areas from being clearly observed when viewing the produced image, thereby making the image appear less uneven.

Preferably, in the second modification, the variation in the angle between the screen plane and the plane of total reflection (lens angle φ) in the areas A1', A2' and A3' is expressed by a numerical formula, and this numerical formula is subjected to spline interpolation in a manner as shown in Example 5 that will be described later, thereby determining the degree of change in the angle of the plane of total reflection in the areas A4 and A5.

SECOND EMBODIMENT

Next, a projection display comprising a projection screen according to the second embodiment of the present invention will be described with reference to FIGS. 11 to 13. The second embodiment of the present invention is the same as the first embodiment described above except that the construction of the lenticular lens is different from that of the lenticular lens in the first embodiment and that the total reflection prism lens and the lenticular lens are integrally made as one sheet. In the second embodiment of the present invention, parts corresponding to those in the aforementioned first embodiment are indicated by like reference numerals, and detailed descriptions for these parts are omitted.

Figure 11:
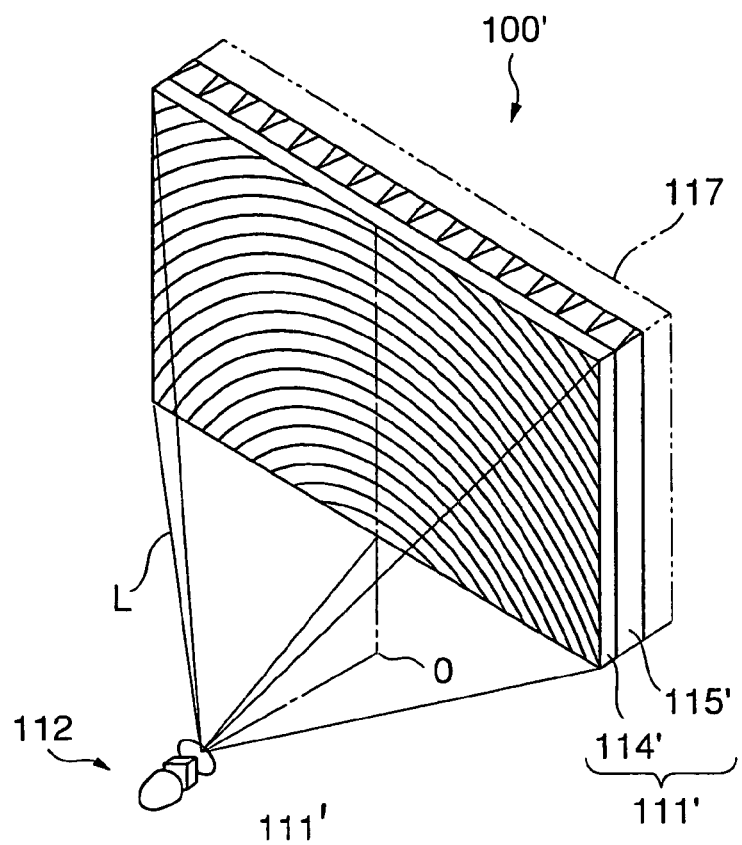
FIG. 11 is a diagrammatic perspective view showing a projection display comprising a projection screen according to the second embodiment of the present invention.

As shown in FIG. 11, a projection display 100' according to the second embodiment of the present invention comprises a projection screen 111', and a projection optical system 112 from which imaging light L is obliquely projected on the projection screen 111'.

The projection screen 111' is for letting imaging light L obliquely projected from the projection optical system 112 placed at its rear side emerge toward the viewer's side, and comprises a total reflection prism lens 114', and a lenticular lens 115' provided on the viewer's side of the total reflection prism lens 114'.

Figure 12:
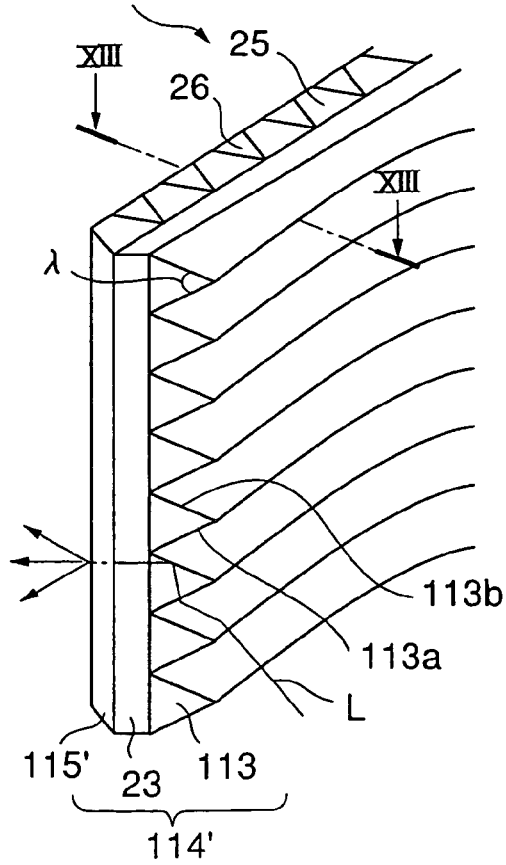
FIG. 12 is a perspective view showing the principal part of the projection screen shown in FIG. 11.

Of these components, the total reflection prism lens 114' is for refracting and condensing imaging light L projected from the projection optical system 112, and, as shown in FIG. 12, comprises a base sheet 23 and a plurality of unit prisms 113 formed on the incident side surface of the base sheet 23 (the outermost plane of incidence on which imaging light L is incident). As in the above-described first embodiment, each unit prism 113 has a plane of incidence (first plane) 113a that refracts incident light, and a plane of total reflection (second plane) 113b that totally reflects the light refracted at the plane of incidence 113a. Further, the unit prisms 113 are formed as prisms in the shape of circular arcs extending concentrically around the center O of the concentric circles that is not on the screen plane (see FIG. 11), and have apical angles λ varying with the position on the screen plane. In particular, it is preferable that the unit prisms 113 have apical angles λ continuously varying from 30° to 45° so that the apical angles λ on the side distant from the center O of the concentric circles (the upper side in the figure) are greater than the apical angles λ on the side close to the center O of the concentric circles (the lower side in the figure). The apical angles λ of the unit prisms 113 may vary in the same various fashions as in the above-described first embodiment (FIGS. 5, 7 and 10, etc.).

Figure 13:
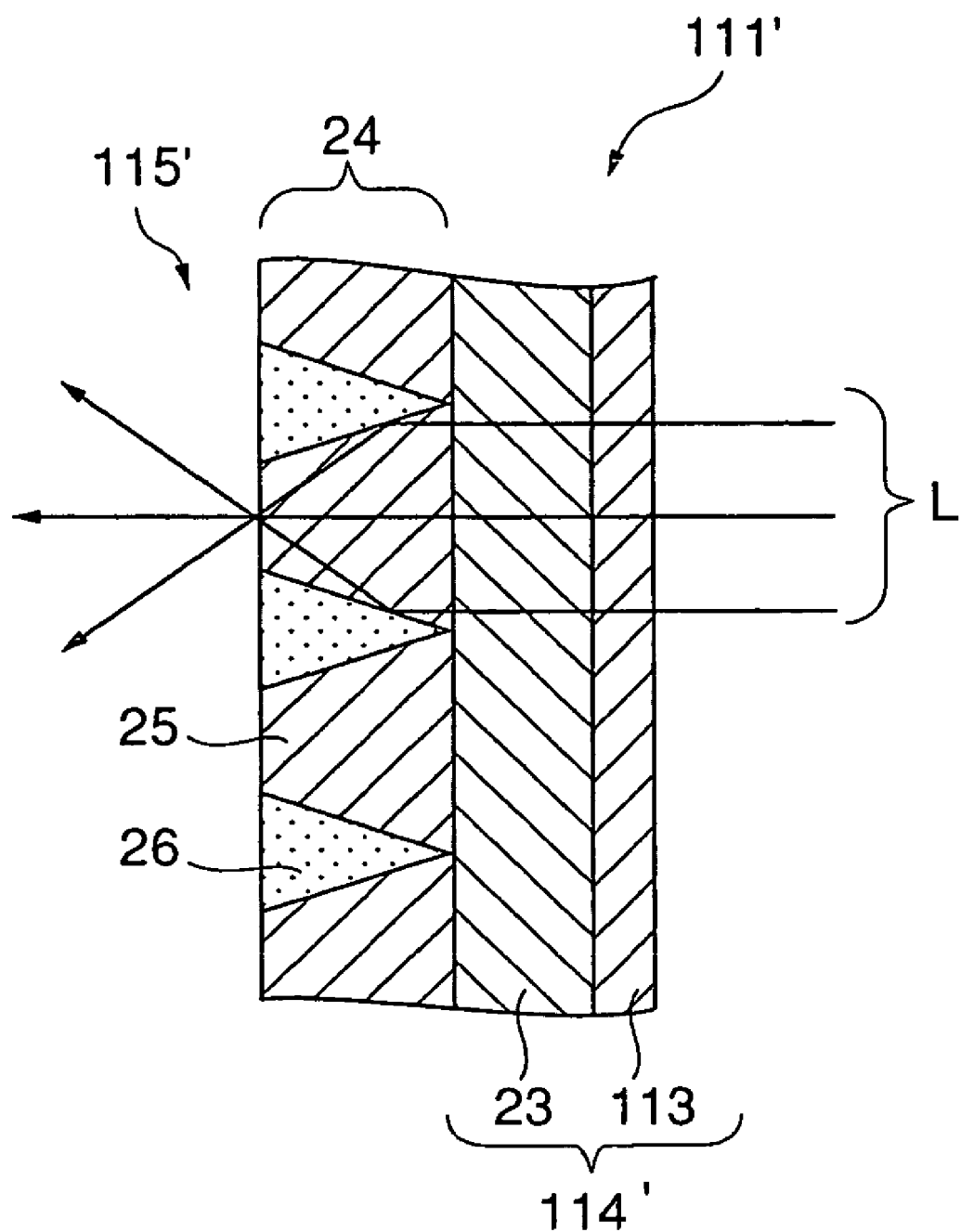
FIG. 13 is a sectional view taken along line XIII—XIII in FIG. 12.

On the other hand, the lenticular lens 115' is provided on the emergent side surface of the base sheet 23, as shown in FIGS. 12 and 13, and has a plurality of trapezoidal portions 25 with trapezoidal cross sections (unit lenses).

The trapezoidal portions 25 are arranged so that the lower base and upper base of each trapezoid face to the incident side and the emergent side, respectively, and, between each two neighboring trapezoidal portions 25, V-shaped portions 26 with V-shaped cross sections are provided. The trapezoidal portions 25 are made from a material having a predetermined refractive index. Further, the V-shaped portions 26 are formed by filling the spaces between each two trapezoidal portions 25 with a material having a refractive index that is lower than the refractive index of the material for the trapezoidal portions 25, whereby the interfaces between the trapezoidal portions 25 and the V-shaped portions 26 provided between each two neighboring trapezoidal portions 25 can totally reflect and diffuse imaging light L (see FIGS. 12 and 13).

Further, it is preferable that the V-shaped portions 26 have the light-absorbing property of absorbing light that enters these portions from the viewer's side. Although any material can be used for the V-shaped portions 26, it is preferable to make them by the use of, for example, a mixture of a synthetic resin having a low refractive index and light-absorbing particles consisting of a dye, a pigment, colored resin fine particles, or the like.

In the projection screen 111' shown in FIGS. 11 to 13, imaging light L obliquely projected from the projection optical system 112 is incident on the plane of incidence 113a of each unit prism 113 of the total reflection prism lens 114'.

The imaging light L incident on the plane of incidence 113a of each unit prism 113 is refracted at this plane and then totally reflected at the plane of total reflection 113b, and the totally reflected light travels in the direction almost vertical to the screen plane towards the viewer's side.

Thereafter, the imaging light L thus emerging from the total reflection prism lens 114' is incident on the lower base side of the trapezoidal portions 25 of the lenticular lens 115'; part of this incident light passes through the lenticular lens 115' as it is, while the remaining part of the incident light is totally reflected at the interfaces between the trapezoidal portions 25 and the V-shaped portions 26, and eventually, all of the light emerges from the upper base side of the trapezoidal portions 25 towards the viewer's side.

Thus, according to the first and second embodiments of the present invention, in the projection screen 111, 111' on which imaging light L is obliquely projected from the projection optical system 112 placed at its rear side, a plurality of unit prisms 113 of the total reflection prism lens 114, 114A, 114B, 114' provided at its back surface on which imaging light L is incident are made to have apical angles λ varying within a certain angle range (e.g., 30° or more and 45° or less) so that the apical angles λ on the side distant from the center O of the concentric circles are greater than the apical angles λ on the side close to the center O of the concentric circles. By this, the apical angles λ of the unit prisms 113 situated in the area on the side close to the projection optical system 112, in which the angle of incidence $\theta_1$ of imaging light L is small, can be made smaller, while the apical angles λ of the unit prisms 113 situated in the area on the side distant from the projection optical system 112, in which the angle of incidence $\theta_1$ of imaging light L is great, can be made greater. For this reason, it is possible to increase the allowable range of the angle of incidence $\theta_1$ of imaging light L that is a range in which imaging light L loss due to the production of stray light is not caused, and there can thus be obtained the projection screen 111, 111' and the projection display 100, 100' that can display, without undergoing lowering of surface brightness or contrast, an image with high quality comparable to an image obtained when imaging light L is projected on a projection screen nearly vertically from a projection optical system 112.

Further, according to the first and second embodiments of the present invention, the first apical-angle-fixed area A1 in which the unit prisms 113 have apical angles λ fixed at a predetermined first angle λ1, the second apical-angle-fixed area A2 whose location is different from that of the first apical-angle-fixed area A1 and in which the unit prisms 113 have apical angles λ fixed at a predetermined second angle λ2 that is different from the first angle λ1, and the apical-angle-varying area A3 situated between the first and second apical-angle-fixed areas A1 and A2 and in which the unit prisms 13 have apical angles λ varying between the first angle λ1 and the second angle λ2 with the position on the screen plane are, as the first modification, provided on the total reflection prism lens 114A, so that it is possible to vary the apical angles λ of the unit prisms 113 of the total prism lens 114A not over the entire screen plane but only partly. By this, it becomes easy to make a mold for use in the molding of the total reflection prism lens 114A, and the projection screen 111, 111' and the projection display 100, 100' that can ensure high image quality can thus be produced more inexpensively.

Furthermore, according to the first and second embodiments of the present invention, the first apical-angle-varying part A3' in which the unit prisms 113 have apical angles λ that vary as only the angle between the screen plane and the plane of incidence 113a varies, with the angle between the screen plane and the plane of total reflection 113b remaining unchanged, and the second and third apical-angle-varying parts A4 and A5 situated between the first apical-angle-varying part A3' and the first apical-angle-fixed area A1' and between the first apical-angle-varying part A3' and the second apical-angle-fixed area A2', respectively, in which the unit prisms 113 have apical angles λ that vary as both the angle between the screen plane and the plane of incidence 113a and the angle between the screen plane and the plane of total reflection 113b vary are, as the second modification, provided in the apical-angle-varying area on the total reflection prism lens 114B, so that it is possible to make the boundaries between the above areas more unclear. Image quality higher than that obtained by the first modification can thus be attained.

Furthermore, according to the first and second embodiments of the present invention, since the plane of incidence 113a of each unit prism 113 has a draft angle of 0° or more to the perpendicular (normal) to the screen plane, the mold for use in the molding of the unit prisms 113 includes no reverse tapered portions. Therefore, it becomes easy to make the mold, and, moreover, the unit prisms 113 can be easily released from the mold in the lens molding process.

Furthermore, according to the first and second embodiments of the present invention, since the surface roughness of the planes of incidence 113a of the unit prisms 113 is uniform over the entire screen plane, it is possible to produce, on the screen plane, an image with no unevenness; a high-quality image can thus be viewed.

OTHER EMBODIMENTS

The present invention is not limited to the above-described first and second embodiments and can be modified or altered variously as described under the following items from (1) to (6). These modifications and alternations also are within the scope of the present invention.

(1) In the above-described first and second embodiments, the total reflection prism lens 114, 114A, 114B, 114' and the lenticular lens 115, 115' are used as a total reflection prism lens and a lenticular lens, respectively. However, as for the concrete shapes of the total reflection prism lens, the lenticular lens and the others, any other construction may also be adopted as long as it meets the characteristic features of the present invention as described above.

(2) In the above-described first embodiment, although the total reflection prism lens 114, 114A, 114B, 114' and the lenticular lens 115, 115' are made as separate sheets (a prism sheet and a lenticular lens sheet), they may also be made integrally as one sheet. On the other hand, in the above-described second embodiment, although the total reflection prism lens 114' and the lenticular lens 115' are made integrally as one sheet, they may also be made as separate sheets (a prism sheet and a lenticular lens sheet).

(3) In the above-described first and second embodiments, a diffusing sheet for diffusing imaging light L that has passed through the total reflection prism lens 114, 114A, 114B, 114' and the lenticular lens 115, 115' may be provided in the position indicated by reference numeral 117 in FIGS. 1 and 11, on the viewer's side of the lenticular lens 115, 115' (on the viewer's side of the total reflection prism lens 114, 114A, 114B, 114' if the lenticular lens 115, 115' is not present). The diffusing sheet is preferably a sheet in which a diffusing agent or the like is incorporated in order to impart diffusing properties to the sheet.

(4) In the above-described first and second embodiments, although the lenticular lens 115, 115' is provided on the viewer's side of the total reflection prism lens 114, 114A, 114B, 114', a diffusing sheet that diffuses light by a diffusing agent or the like, a beads screen coated with a plurality of beads that diffuse light by means of refraction of light, or the like may also be used instead of the lenticular lens 115, 115'.

(5) In the above-described first and second embodiments, a functional layer may also be provided in the position indicated by reference numeral 117 in FIGS. 1 and 11, on the viewer's side of the lenticular lens 115, 115' (on the viewer's side of the total reflection prism lens 114, 114A, 114B, 114' if the lenticular lens 115, 115' is not present). A variety of functional layers can be used, and examples of such layers include an antireflection layer (AR layer), a hard coat layer (HC layer), an antistatic layer (AS layer), an anti-glaring layer (AG layer), a stain-resistant layer, and a sensor layer.

The antireflection layer (AR layer) is for restraining the reflection of light at the projection screen 100, 100', and can be obtained by laminating, to a lens surface, a film having the function of restraining the reflection of light, or by subjecting a lens surface directly to antireflection treatment. The hard coat layer (HC layer) is for protecting the surface of the projection screen 100, 100' from scratches, and can be obtained by laminating, to a lens surface, a wear-resistant film having the reinforcing action, or by subjecting a lens surface directly to hard coat treatment. The antistatic layer (AS layer) is for removing static electricity that occurs on the projection screen 100, 100', and can be obtained by laminating an antistatic film to a lens surface, or by subjecting a lens surface directly to antistatic treatment. The anti-glaring layer (AG layer) is for preventing glaring of the projection screen 100, 100', and can be obtained by laminating, to a lens surface, a film having the function of preventing glaring, or by subjecting a lens surface directly to anti-glaring treatment. The stain-resistant layer is for preventing the surface of the projection screen 100, 100' from being stained, and can be obtained by laminating, to a lens surface, a film having the function of preventing staining, or by subjecting a lens surface to stain-resistant treatment. The sensor layer is a layer that can function as a touch sensor or the like.

(6) In the projection displays 100, 100' according to the above-described first and second embodiments, although the upward projection mode in which imaging light L emitted from the projection optical system 112 is upwardly projected on the projection screen 111, 111' is adopted, the downward projection mode in which imaging light L emitted from the projection optical system 112 is downwardly projected on the projection screen 111, 111' may also be adopted.

Figure 14:
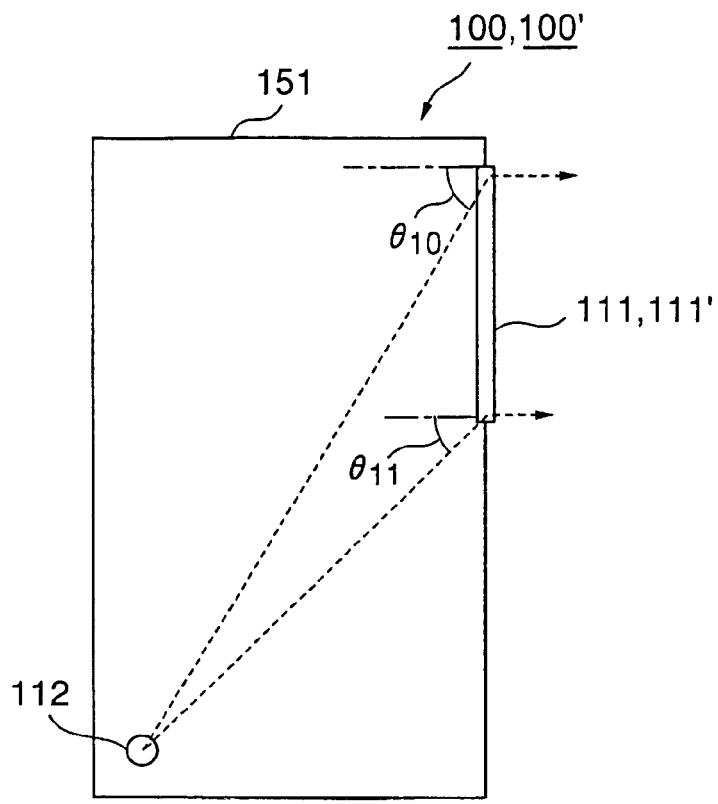
FIG. 14 is a view showing the first assembly example of a projection display comprising a projection screen according to the first or second embodiment of the present invention.

In the case where the upward projection mode is adopted in the projection display 100, 100', the projection screen 111, 111' and the projection optical system 112 are contained within a cabinet 151 with their positional relation as shown in FIG. 14, for example. Specifically, for example, by using an LCD light bulb as an imaging light source in the projection optical system 112, it is possible to project, on a 50-inch projection screen 111, 111', an image from below the screen so that the angle of incidence $\theta_{11}$ at which imaging light L is incident on the bottom of the screen plane is 45° and that the angle of incidence $\theta_{10}$ at which imaging light L is incident on the top of the screen plane is 60°. In this case, the horizontal distance between the projection screen 111, 111' and the projection optical system 112 is approximately 800 mm.

Figure 15:
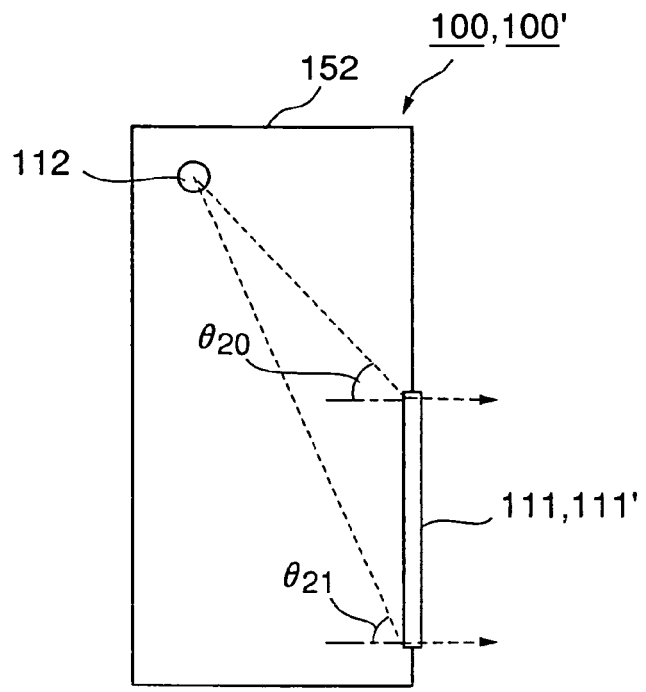
FIG. 15 is a view showing the second assembly example of a projection display comprising a projection screen according to the first or second embodiment of the present invention.

On the other hand, when the downward projection mode is adopted in the projection display 100, 100', the projection screen 111, 111' and the projection optical system 112 are contained within a cabinet 152 with their positional relation as shown in FIG. 15, for example. Specifically, for example, by using a DMD as an imaging light source in the projection optical system 112, it is possible to project, on a 50-inch projection screen 111, 111', an image from above the screen so that the angle of incidence $\theta_{20}$ at which imaging light L is incident on the top of the screen plane is 45° and that the angle of incidence $\theta_{21}$ at which imaging light L is incident on the bottom of the screen plane is 70°. In this case, the horizontal distance between the projection screen 111, 111' and the projection optical system 112 becomes approximately 700 mm.

Figure 16:
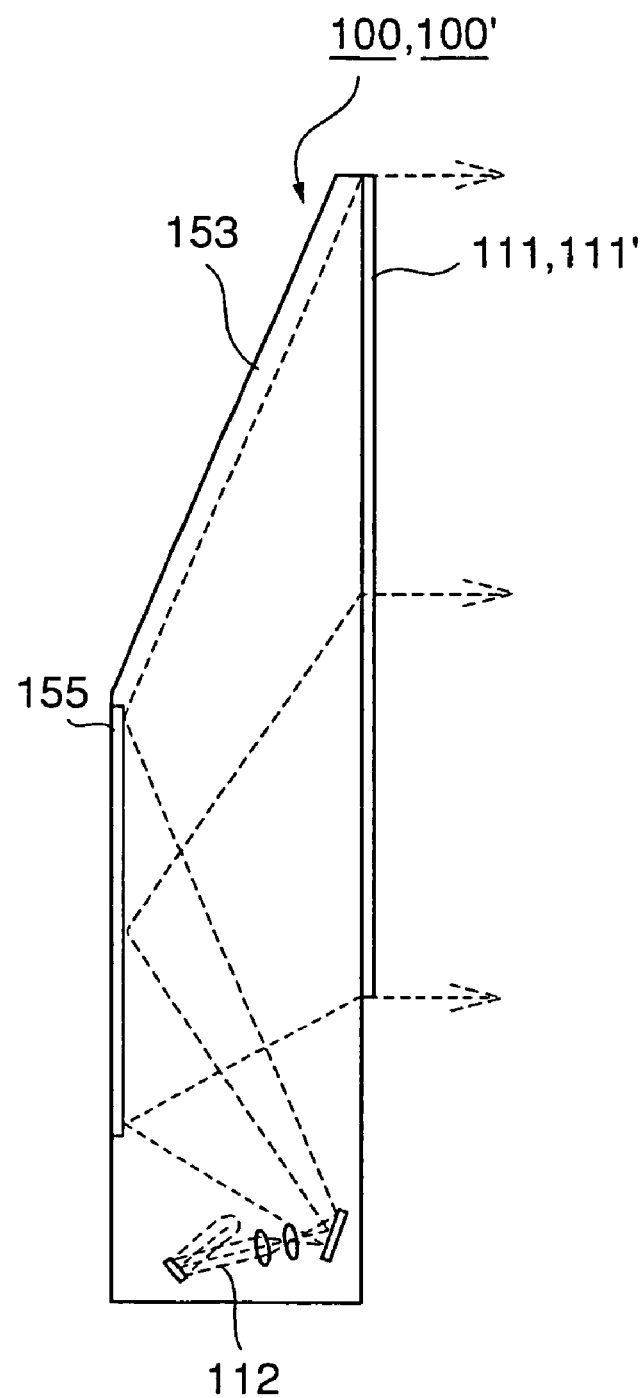
FIG. 16 is a view showing the third assembly example of a projection display comprising a projection screen according to the first or second embodiment of the present invention.

In the projection displays 100 and 100' shown in FIGS. 14 and 15, imaging light L emitted from the projection optical system 112 is projected directly on the projection screen 111, 111'. However, the projection screen and the projection optical system may also be contained within a cabinet 153 with their positional relation as shown in FIG. 16 so that imaging light L emitted from the projection optical system 112 is projected on the projection screen 111, 111' via a reflector 155.

EXAMPLES

Specific examples of the aforementioned embodiments will now be given below.

Example 1

A projection screen for use in a 50-inch rear projection type television, comprising a prism sheet and a lenticular lens sheet, was produced as a projection screen of Example 1. The projection screen of Example 1 corresponds to the first embodiment described above.

First of all, by the use of a mold obtained by cutting using an NC lathe, an ultraviolet-curing resin (refractive index of the cured resin: 1.55) placed on an acrylic base sheet with a thickness of 1.8 mm was cured and shaped, whereby a prism sheet with a total thickness of 2 mm, having a total reflection prism lens on its one surface, was obtained.

Figure 17:
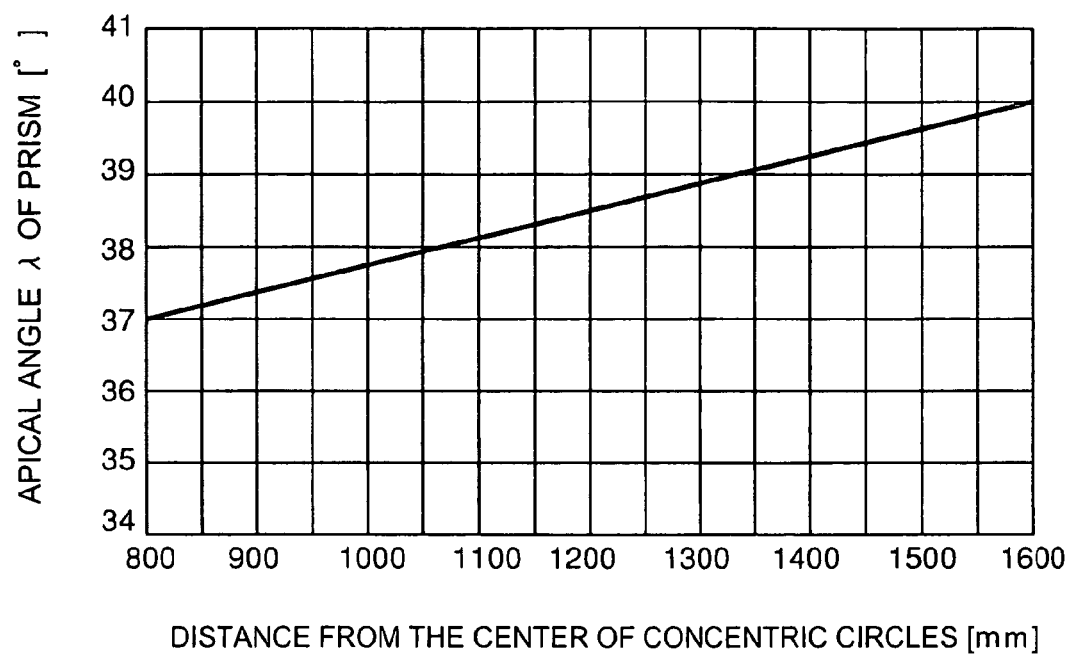
FIG. 17 is a diagram showing the relationship between the position and apical angle of each unit prism in the total reflection prism lenses in Examples 1 to 3.

In the above process, the total reflection prism lens was formed on the prism sheet so that it had a plurality of prisms (unit prisms) in the shape of circular arcs concentrically extending around the center of the concentric circles that was not on the screen plane. The radius (the distance from the center of the concentric circles) of the circular arc of the unit prism at the center of the bottom of the screen plane was made 800 mm; the prism pitch was made 100 µm; and the height of the each prism was made approximately 150 µm. Further, the unit prism situated at the lower edge of the screen plane (on the side closest to the center of the concentric circles) was made to have an apical angle λ of 37°; the unit prism situated at the upper edge of the screen plane (on the side most distant from the center of the concentric circles) was made to have an apical angle λ of 40°; and the unit prisms situated between the above two unit prisms were made to have apical angles λ varying from 37° to 40° (see FIG. 17). The angle of emergence $\theta_5$ at which imaging light emerges from each unit prism was made 0 (normal emergence).

Next, by the use of a cylindrical roll mold, a lenticular lens sheet was prepared by extruding an impact-resistant acrylic resin.

In the above process, a lenticular lens was formed on the lenticular lens sheet so that it had a plurality of unit lenses with half-elliptic cross sections. The transverse diameter of each unit lens was made 140 µm, and the longitudinal diameter of each unit lens was made 100 µm. Further, the lens pitch was made 140 µm, and the height of each unit lens was made 50 µm. As a result, the following diffusion properties were obtained: the angle of horizontal diffusion was 35° when expressed as half angle, and the angle of vertical diffusion was 15° when expressed as half angle.

When making the lenticular lens sheet by extrusion, extremely small amounts of a black dye and a diffusing agent were incorporated in the impact-resistant acrylic resin. The lenticular lens sheet thus produced was found to have a transmittance of 70% and to have the property of preventing reflection of extraneous light, etc. and the diffusing effect.

A projection screen was produced by the combination use of the above-prepared prism sheet and lenticular lens sheet. The projection screen produced in this manner was then incorporated into a projection display (rear projection type television) of upward projection mode as shown in FIG. 14. The screen size of the projection screen was 50 inches, and an LCD light bulb was used as an imaging light source in the projection optical system. The projection optical system was placed 800 mm below the lower edge of the screen plane, and the horizontal distance between the projection screen and the projection optical system (projection distance) was made 800 mm. Further, the angle of incidence $\theta_{11}$ at which imaging light was incident on the bottom of the screen plane was made 45°, and the angle of incidence $\theta_{10}$ at which imaging light was incident on the center of the top of the screen plane was made 60°.

Example 2

A projection screen for use in a 50-inch rear projection type television, comprising a total reflection prism sheet and a lenticular lens sheet that had been integrally made as one sheet, was produced as a projection screen of Example 2. The projection screen of Example 2 corresponds to the second embodiment described above.

First of all, by the use of a mold obtained by cutting using an NC lathe, an ultraviolet-curing resin (refractive index of the cured resin: 1.55) placed on an acrylic base sheet with a thickness of 1.8 mm was cured and shaped, whereby a prism sheet with a total thickness of 2 mm, having a total reflection prism lens on its one surface, was prepared.

In the above process, the total reflection prism lens was formed on the prism sheet so that it had a plurality of prisms (unit prisms) in the shape of circular arcs concentrically extending around the center of the concentric circles that was not on the screen plane. The radius (the distance from the center of the concentric circles) of the circular arc of the unit prism at the center of the bottom of the screen plane was made 800 mm; the prism pitch was made 100 µm; and the height of each prism was made approximately 150 µm. Further, the unit prism situated at the lower edge of the screen plane (on the side closest to the center of the concentric circles) was made to have an apical angle λ of 37°; the unit prism situated at the upper edge of the screen plane (on the side most distant from the center of the concentric circles) was made to have an apical angle λ of 40°; and the unit prisms situated between the above two unit prisms were made to have apical angles λ varying from 37° to 40° (see FIG. 17). The angle of emergence $\theta_5$ at which imaging light emerges from each unit prism was made 0 (normal emergence).

Next, on the other surface of the prism sheet prepared in the above-described manner, a plurality of trapezoidal portions with trapezoidal cross sections (unit lenses) were formed, and the spaces between each two neighboring trapezoidal portions were filled with a low-refractive-index resin containing light-absorbing particles, thereby forming V-shaped portions. An epoxy acrylate having a high refractive index was used as the material for the trapezoidal portions. A urethane acrylate having a low refractive index was used as the material for the V-shaped portions; and RUBCOULEUR (trademark) manufactured by Dainichiseika Color & Chemicals Mfg. Co., Ltd., Japan was used as the light-absorbing particles. RUBCOULEUR had a mean particle diameter of 8 µm, and was added in an amount of 45% by weight.

In the above process, the lens pitch of the trapezoidal portions was made 50 µm, and the refractive index of these portions was made 1.57. Further, the refractive index of the V-shaped portions was made 1.48. The length of the upper base of each trapezoidal portion and that of the base of the triangle of the V-shaped portion were made equal to each other, thereby making the so-called black stripe percentage 50%. The vertical angle of each V-shaped portion was made 20°.

Thus, the total reflection prism lens and the lenticular lens were integrally made as one sheet to give a projection screen. This projection screen was then incorporated, as in Example 1, into a projection display (rear projection type television) of upward projection mode as shown in FIG. 14. The screen size of the projection screen was 50 inches, and an LCD light bulb was used as an imaging light source in the projection optical system. The projection optical system was placed 800 mm below the lower edge of the screen plane, and the horizontal distance between the projection screen and the projection optical system (projection distance) was made 800 mm. Further, the angle of incidence $\theta_{11}$ at which imaging light was incident on the bottom of the screen plane was made 45°, and the angle of incidence $\theta_{10}$ at which imaging light was incident on the center of the top of the screen plane was made 60°.

Example 3

A projection screen of Example 3 was prepared by laminating a 0.1 mm thick AR coat film to the front surface (the outermost surface on the viewer's side) of the lenticular lens in the projection screen of Example 2.

Example 4

A projection screen of Example 4 was prepared by altering mainly the way of variation in the apical angle λ of the unit prism of the total reflection prism lens of the prism sheet in the projection screen of Example 1. The projection screen of Example 4 corresponds to the first modification of the first embodiment described above.

Specifically, in Example 4, a total reflection prism lens was formed on the prism sheet of the projection screen so that it had a plurality of prisms (unit prisms) in the shape of circular arcs concentrically extending around the center of the concentric circles that was not on the screen plane. The radius (the distance from the center of the concentric circles) of the circular arc of the unit prism at the center of the bottom of the screen plane was made 250 mm; and the prism pitch was made 100 µm. Further, the unit prism situated at the lower edge of the screen plane (on the side closest to the center of the concentric circles) was made to have an apical angle λ of 35°; the unit prism situated at the upper edge of the screen plane (on the side most distant from the center of the concentric circles) was made to have an apical angle λ of 40°; and the unit prisms situated in the area between distance r1 from the center of the concentric circles of 529.6 mm (angle of incidence: 57.3°) and distance r2 from the center of the concentric circles of 605.9 mm (angle of incidence: 60.7°) were made to have apical angles λ varying from 35° to 40°. The solid line in FIG. 18 indicates the relationship between the position and apical angle λ of each unit prism situated in the vicinity of the area in which the apical angles λ of the unit prisms vary.

Figure 19:
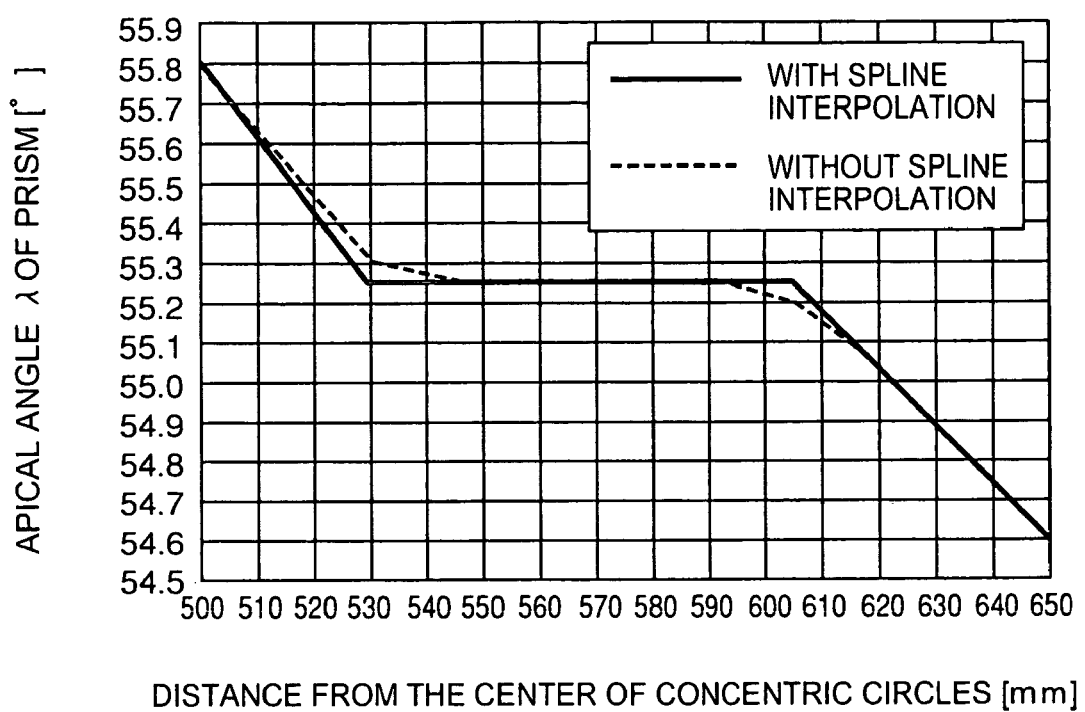
FIG. 19 is a diagram showing the relationship between the position and lens angle of each unit prism (the relationship between them in the vicinity of the area in which the apical angles of the unit prisms vary) in the total reflection prism lenses in Examples 4 and 5.
Figure 20:
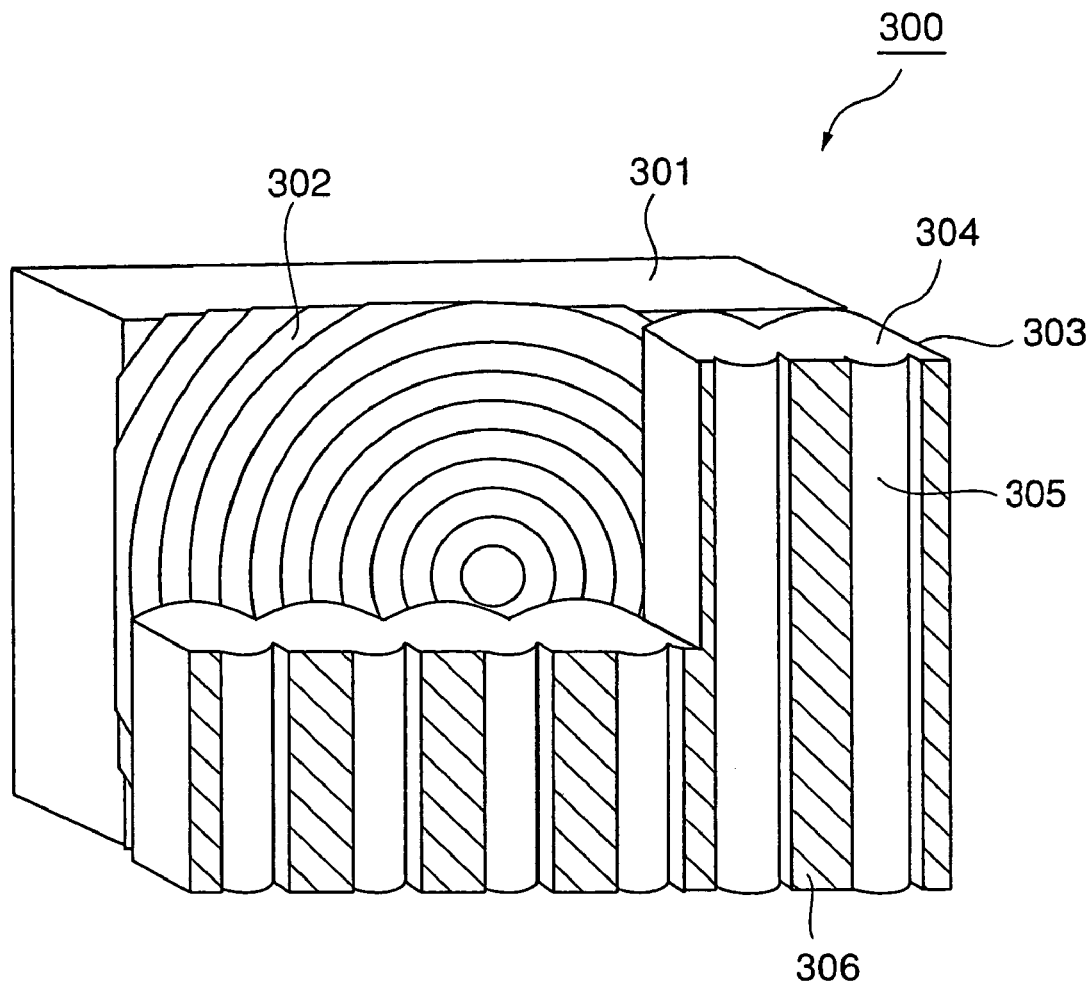
FIG. 20 is a view showing an example of a projection screen comprising a conventional Fresnel lens sheet.
Figure 21:
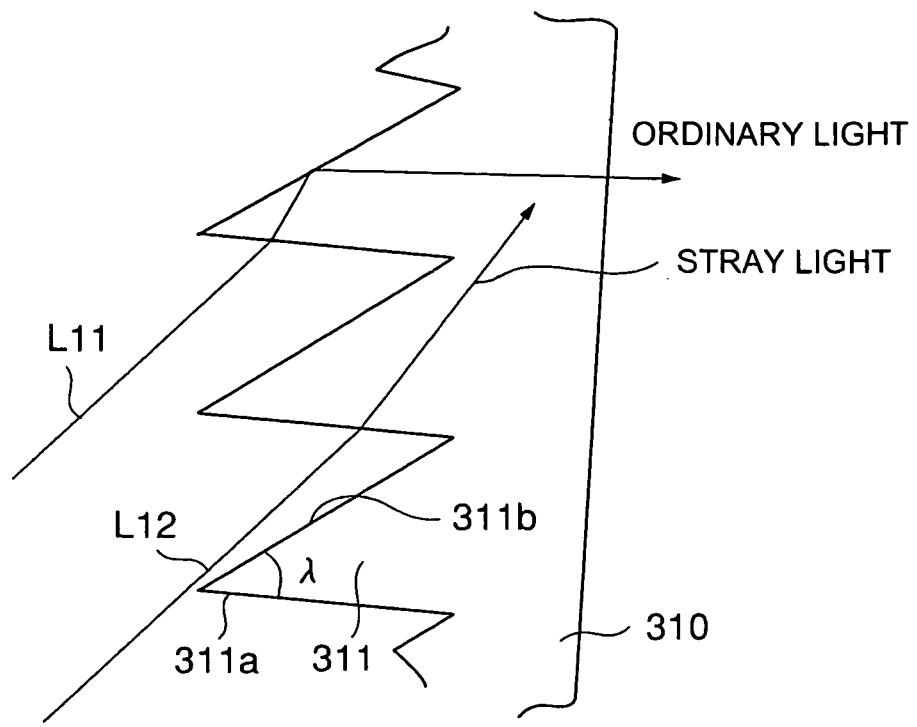
FIG. 21 is an illustration for explaining the light path of imaging light, when the unit prisms have great apical angles, in a projection screen comprising a total reflection prism lens.
Figure 22:
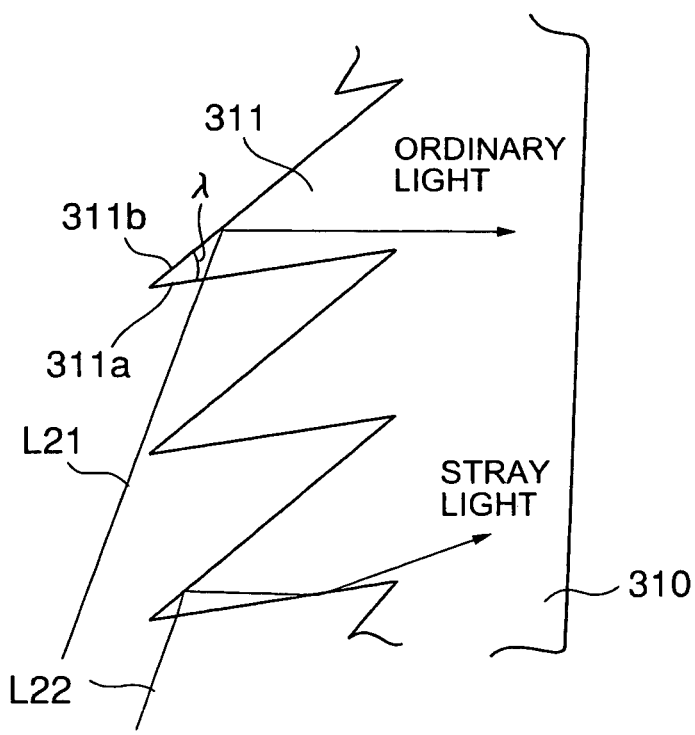
FIG. 22 is an illustration for explaining the light path of imaging light, when the unit prisms have small apical angles, in a projection screen comprising a total reflection prism lens.

The lens angles φ of the unit prisms situated in the area between distance r1 from the center of the concentric circles of 529.6 mm (angle of incidence: 57.3°) and distance r2 from the center of the concentric circles r2 of 605.9 mm (angle of incidence: 60.7°) were fixed at 55.25°, as indicated by the solid line in FIG. 19. The angle of emergence $\theta_5$ at which imaging light emerges from each unit prism was made 0 (normal emergence).

By the combination use of the prism sheet prepared in the above-described manner and the same lenticular lens sheet as that in Example 1, a projection screen was produced. The projection screen produced in this manner was then incorporated into a projection display (rear projection type thin television) of upward projection mode as shown in FIG. 14. The screen size of the projection screen was 55 inches (16:9), and an LCD light bulb was used as an imaging light source in the projection optical system. The projection optical system was placed 250 mm below the lower edge of the screen plane, and the horizontal distance between the projection screen and the projection optical system (projection distance) was made 340 mm. Further, the angle of incidence $\theta_1$ at which imaging light was incident on the bottom of the screen plane (distance from the center of concentric circles: 250 mm) was made 36.3°, and the angle of incidence $\theta_1$ at which imaging light was incident on the top corner of the screen plane (distance from the center of the concentric circles: 1116 mm) was made 73.0°.

Example 5

A projection screen of Example 5 was prepared by altering the way of variation in the apical angle λ of the unit prism of the total reflection prism lens of the prism sheet in the projection screen of Example 4. The projection screen of Example 5 corresponds to the second modification of the first embodiment described above.

The same projection screen as that of Example 4 was prepared as the projection screen of Example 5, provided that the unit prisms of the total reflection prism lens on the prism sheet, situated in the area between a distance from the center of the concentric circles of 500 mm and a distance from the center of the concentric circles of 650 mm, were made to have lens angles φ determined by the use of a spline interpolation function with a node of 5.

Figure 18:
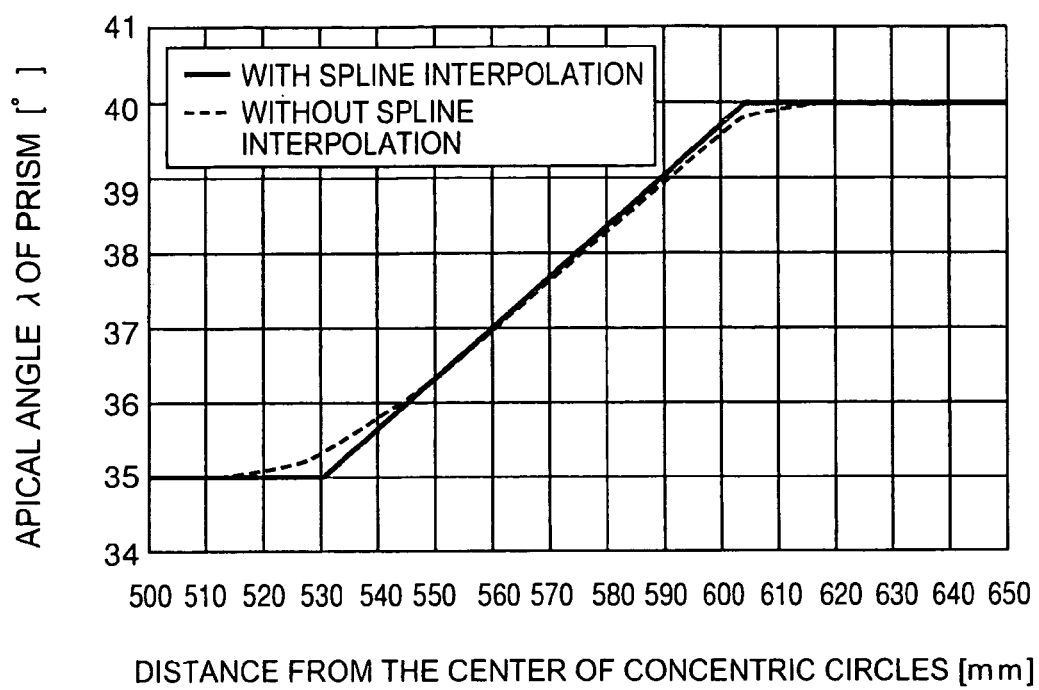
FIG. 18 is a diagram showing the relationship between the position and apical angle of each unit prism (the relationship between them in the vicinity of the area in which the apical angles of the unit prisms vary) in the total reflection prism lenses in Examples 4 and 5.

The relationship between the position and apical angle λ of each unit prism in the vicinity of the area in which the apical angles λ of the unit prisms vary is indicated by the dotted line in FIG. 18. Further, the relationship between the position and lens angle φ of each unit prism in the vicinity of the area in which the apical angles λ of the unit prisms vary is indicated by the dotted line in FIG. 19.

The following Eq. (9) was used as the spline interpolation function:

$$\phi = \phi_1 + \sum_{k=1}^{5} \Delta_k \left[ \left\{ 1 + \left(1 + \frac{r - r_k}{r_5 - r_1}\right)^m \right\}^{\frac{1}{m}} - 1 \right], \quad (9)$$

where
$\Delta_1 = (\phi_2 - \phi_1)/a_1$, $\Delta_k = (\phi_{k+1} - \phi_k)/a_k - (\phi_k - \phi_{k-1})/a_{k-1}$, in which $a_k = (r - r_k)/(r_5 - r_1)$.

The parameters in Eq. (9) were as shown in the table below.

m=32

| k | 1 | 2 | 3 | 4 | 5 |
|---|---|---|---|---|---|
| r | 475 | 500 | 530 | 605 | 640 |
| a | 0 | 0.15152 | 0.33333 | 0.78788 | 1 |
| φ | 56.3 | 55.807 | 55.25 | 55.25 | 54.745 |
| Δ | −3.2538 | 0.1903 | 3.0635 | −2.3807 | — |

After determining the angle of the plane of total reflection of each unit prism (lens angle φ) by the use of the spline interpolation function of the above Eq. (9), the angle of the plane of incidence γ and apical angle λ of the unit prism were calculated by the following Eq. (10):

tan γ={cos θ$_1$(tan φ·sin φ+cos φ)−n(tan φ·sin φ−cos φ)}/{sin θ$_1$(tan φ·sin φ+cos φ)−2n sin φ},  (10)

where λ=π/2+γ−φ.

By the combination use of the prism sheet prepared in the above-described manner and the same lenticular lens sheet as that in Example 1, a projection screen was produced. The projection screen thus produced was then incorporated, as in Example 4, into a projection display (rear projection type thin television) of upward projection mode as shown in FIG. 14. The screen size of the projection screen was 55 inches (16:9), and an LCD light bulb was used as an imaging light source in the projection optical system. The projection optical system was placed 250 mm below the lower edge of the screen plane, and the horizontal distance between the projection screen and the projection optical system (projection distance) was made 340 mm. Further, the angle of incidence $\theta_1$ at which imaging light was incident on the center of the bottom of the screen plane (distance from the center of the concentric circles: 250 mm) was made 36.3°, and the angle of incidence $\theta_1$ at which imaging light was incident on the top corner of the screen plane (distance from the center of the concentric circles: 1116 mm) was made 73.0°.

Comparative Example 1

The procedure of Example 4 was repeated, except that the unit prisms of the total prism lens in the projection screen were made to have a fixed apical angle λ of 40°, thereby producing a projection screen of Comparative Example 1.

Comparative Example 2

The procedure of Example 4 was repeated, except that the unit prisms of the total prism lens in the projection screen, situated in the area less than 544 mm distant from the center of the concentric circles (angle of incidence: 58.0°), were made to have a fixed apical angle λ of 35°, thereby producing a projection screen of Comparative Example 2.

In the total reflection prism lens in Comparative Example 2, the apical angles λ of the unit prisms situated in the area more than 544 mm distant from the center of the concentric circles are negative (λ<0) according to the above-described Eqs. (1) to (3) concerning the total reflection prism lens. Therefore, in order to let imaging light emerge vertically from this area, the planes of incidence of the unit prisms situated in this area were made vertical, and the lens angle φ of the Fresnel lens was determined by the following Eq. (11):

φ={sin$^{-1}$(cos θ$_1$/n)+π/2}/2.  (11)

In this case, the unit prisms of the total reflection prism lens in the projection screen of Comparative Example 2, situated in the area more than 544 mm distant from the center of the concentric circles, are to have apical angles λ increasing gradually from 35°, and the planes of incidence of the unit prisms become rough surfaces with flaws created while cutting a mold material.

(Results of Evaluation)

The projection screen of Example 1 was found to have a wide allowable range of the angle of incidence, and a high-quality image was obtained with this projection screen without undergoing lowering of surface brightness or contrast. The transmittance was 60%, the reflectance was 5%, and the gain was 3. Further, the angle of vertical diffusion (vertical viewing angle) was 10° (half angle), and that of horizontal diffusion (horizontal viewing angle) was 25° (half angle).

The projection screen of Example 2 was, like the projection screen of Example 1, found to have a wide allowable range of the angle of incidence, and a high-quality image was obtained with this projection screen without undergoing lowering of surface brightness or contrast. The transmittance was 80%, the reflectance was 5%, and the gain was 4. Further, the angle of vertical diffusion (vertical viewing angle) was 12° (half angle), and that of horizontal diffusion (horizontal viewing angle) was 25° (half angle).

The projection screen of Example 3 was, like the projection screen of Example 2, found to have a wide allowable range of the angle of incidence, and a high-quality image was obtained with this projection screen without undergoing lowering of surface brightness or contrast. This projection screen was also found to have a reflectance improved by 1.5% over the projection screen of Example 2.

The projection screens of Examples 4 and 5 were found to have wide allowable ranges of the angle of incidence, and high-quality images were obtained with these projection screens without undergoing lowering of surface brightness or contrast. In particular, the image quality was uniform over the entire screen planes, and images with extremely high quality were obtained.

On the other hand, in the case of the projection screen of Comparative Example 1, the central part of the bottom of the screen plane appeared slightly dark as compared with the projection screens of Examples 1 to 4, and ghost images were observed.

In the case of the projection screen of Comparative Example 2, the boundary, 544 mm distant from the center of the concentric circles, between the two areas different in the angle of the plane of incidence of the unit prism and its vicinity were clearly observed.

The invention claimed is:

1. A projection screen that allows imaging light obliquely projected from a projection optical system placed at a rear side of the projection screen to emerge toward a viewer's side of the projection screen, comprising:
   a total reflection prism lens having a plurality of unit prisms provided on its back surface on which imaging light is incident, each of the unit prisms having a first plane that refracts the incident light and a second plane that totally reflects the light refracted by the first plane,
   wherein each of the unit prisms has an apical angle that corresponds to an angle between the first and second planes, and the apical angles of the unit prisms vary with position of each of the unit prisms on a screen plane.

2. The projection screen according to claim 1, wherein the unit prisms concentrically extend around a center of concentric circles that is not on the screen plane.

3. The projection screen according to claim 2, wherein the unit prisms have apical angles varying so that the apical angles on a side distant from the center of the concentric circles are greater than the apical angles on a side close to the center of the concentric circles.

4. The projection screen according to claim 3, wherein the unit prisms have apical angles that vary continuously as the position of the unit prism varies from the side close to the center of the concentric circles to the side distant from this center.

5. The projection screen according to claim 1, wherein the unit prisms have apical angles varying from 30° to 45°.

6. The projection screen according to claim 1, wherein the total reflection prism lens has:
   a first apical-angle-fixed area in which the unit prisms have apical angles fixed at a first predetermined angle;
   a second apical-angle-fixed area whose location is different from that of the first apical-angle-fixed area and in which the unit prisms have apical angles fixed at a second predetermined angle that is different from the first predetermined angle; and
   an apical-angle-varying area that is situated between the first and second apical-angle-fixed areas and in which the unit prisms have apical angles varying between the first and second predetermined angles with position on the screen plane.

7. The projection screen according to claim 6, wherein the apical-angle-varying area comprises a first apical-angle-varying part in which the unit prisms have apical angles that vary only as an angle between the first plane of the unit prism and the screen plane varies, while an angle between the second plane of the unit prism and the screen plane remains unchanged.

8. The projection screen according to claim 7, wherein the apical-angle-varying area further comprises:
   a second apical-angle-varying part situated between the first apical-angle-varying part and the first apical-angle-fixed area in which the unit prisms have apical angles that vary both as an angle between the first plane of the unit prism and the screen plane varies and as an angle between the second plane of the unit prism and the screen plane varies; and
   a third apical-angle-varying part situated between the first apical-angle-varying area and the second apical-angle-fixed area in which the unit prisms have apical angles that vary both as an angle between the first plane of the unit prism and the screen plane varies and as an angle between the second plane of the unit prism and the screen plane varies.

9. The projection screen according to claim 1, wherein the first plane of each of the unit prisms has a draft angle of 0° or more with respect to a line perpendicular to the screen plane.

10. The projection screen according to claim 1, wherein the first planes of the unit prisms have a surface roughness that is uniform over the entire screen plane.

11. The projection screen according to claim 1, further comprising a lenticular lens for diffusing light that has passed through the total reflection prism lens, the lenticular lens being provided on a viewer's side of the total reflection prism lens.

12. The projection screen according to claim 11, wherein the lenticular lens has a plurality of unit lenses with half-elliptic cross sections.

13. The projection screen according to claim 11, wherein the lenticular lens has a plurality of unit lenses with trapezoidal cross sections.

14. The projection screen according to claim 13, wherein:
   the unit lenses with trapezoidal cross sections are arranged so that a lower base and upper base of each trapezoid face to the incident side and the emergent side of the lenticular lens, respectively;

portions of the lenticular lens with V-shaped cross sections are provided between each two neighboring unit lenses;

the unit lenses are made from a material having a predetermined refractive index; the portions of the lenticular lens with V-shaped cross sections comprise a material having a refractive index that is lower than the refractive index of the material for the unit lenses; and interfaces between the unit prisms and the portions of the lenticular lens with V-shaped cross sections allow light to be totally reflected.

15. The projection screen according to claim 14, wherein the portions of the lenticular lens with V-shaped cross sections have a light-absorbing property of absorbing light entering from the viewer's side of the projection screen.

16. The projection screen according to claim 15, wherein the portions of the lenticular lens with V-shaped cross sections are made from a resin mixed with light-absorbing particles.

17. The projection screen according to claim 11, wherein the total reflection prism lens and the lenticular lens are integrally made as one sheet.

18. The projection screen according to claim 11, further comprising a diffusing sheet for diffusing light that has passed through both the total reflection prism lens and the lenticular lens, provided on a viewer's side of the lenticular lens.

19. The projection screen according to claim 1, further comprising a diffusing sheet for diffusing light that has passed through the total reflection prism lens, provided on a viewer's side of the total reflection prism lens.

20. The projection screen according to claim 1, further comprising a functional layer comprising at least one layer selected from the group consisting of an antireflection layer, a hard coat layer, an antistatic layer, an anti-glaring layer, a stain-resistant layer, and a sensor layer.

21. A projection display comprising:
a projection screen as set forth in claim 1; and
a projection optical system for obliquely projecting imaging light on the projection screen.

22. A total reflection prism sheet for use in a projection screen that allows imaging light obliquely projected from a projection optical system placed at a rear side of the projection screen to emerge toward a viewer's side of the projection screen, comprising:
a total reflection prism lens having a plurality of unit prisms provided on its back surface on which imaging light is incident, each of the unit prisms having a first plane that refracts light and a second plane that totally reflects the light refracted at the first plane,
wherein each of the unit prisms has an apical angle that corresponds to an angle between the first and second planes, and the apical angles of the unit prisms vary with position of each of the unit prisms on a screen plane.

* * * * *